(12) United States Patent
Hutchens et al.

(10) Patent No.: US 11,047,794 B2
(45) Date of Patent: Jun. 29, 2021

(54) APPARATUS AND METHOD FOR DARK VOLTAGE REMOVAL FOR ENHANCING DYNAMIC RANGE, BANDWIDTH, AND QUALITY OF STEP-SCAN FOURIER TRANSFORM INFRARED (FTIR) SPECTROSCOPY DATA

(71) Applicant: THE BOARD OF REGENTS FOR OKLAHOMA STATE UNIVERSITY, Stillwater, OK (US)

(72) Inventors: Chriswell G. Hutchens, Stillwater, OK (US); Cheng Hao, Stillwater, OK (US); Aihua Xie, Stillwater, OK (US); Johnny Hendriks, Amsterdam (NL)

(73) Assignee: The Board of Regents for Oklahoma State University, Stillwater, OK (US)

( * ) Notice: Subject to any disclaimer, the term of this patent is extended or adjusted under 35 U.S.C. 154(b) by 99 days.

(21) Appl. No.: 16/488,840

(22) PCT Filed: Mar. 6, 2018

(86) PCT No.: PCT/US2018/021113
§ 371 (c)(1),
(2) Date: Aug. 26, 2019

(87) PCT Pub. No.: WO2018/165135
PCT Pub. Date: Sep. 13, 2018

(65) Prior Publication Data
US 2020/0072735 A1 Mar. 5, 2020

Related U.S. Application Data

(60) Provisional application No. 62/467,564, filed on Mar. 6, 2017.

(51) Int. Cl.
*G01N 21/27* (2006.01)
*G01J 3/45* (2006.01)
*G01N 21/35* (2014.01)

(52) U.S. Cl.
CPC .............. *G01N 21/274* (2013.01); *G01J 3/45* (2013.01); *G01N 2021/3595* (2013.01); *G01N 2201/124* (2013.01)

(58) Field of Classification Search
CPC .......... G01J 3/2889; G01J 3/45; G01J 3/4535; G01N 21/274; G01N 2021/3595
See application file for complete search history.

(56) References Cited

U.S. PATENT DOCUMENTS 5,612,784 A  3/1997  Curbelo
6,657,720 B1 * 12/2003  Kaselis ................. G01J 3/0291
                                                  356/317

(Continued)

OTHER PUBLICATIONS

Behzard, R., Design of Integrated Circuits for Optical Communications. Boston: McGraw-Hill 2003. Chapter 4, "Feedback TIAs," pp. 86-87 (Year: 2003).*

(Continued)

*Primary Examiner* — Yara B Green
(74) *Attorney, Agent, or Firm* — McAfee & Taft. A Professional Corporation

(57) ABSTRACT

A system and method that improves and enhances the quality of step-scan Fourier Transform Infrared spectroscopy data. The system and method enables the removal of dark voltage with greater accuracy, provides access to previously unobtainable IR spectral information data which is amplified by the disclosed system and method. The system and method removes dark interferogram voltage from an interferogram of interest obtained during nanosecond or microsecond step-scan measurement. The system and method includes a programmable high gain setting to (Continued)

amplify both signal and noise into the analog-to-digital quantization range to allow signal averaging for obtaining additional bits of resolution. The system and method also accounts for and corrects intrinsic offset voltages introduced by the electronics of the disclosed system. The system and method enable precise interferogram measurement and post-laser excitation or provision for other stimuli that result in a material change of state exploration in nanosecond or microsecond speed.

43 Claims, 22 Drawing Sheets

(56) References Cited

U.S. PATENT DOCUMENTS

| | | | |
|---|---|---|---|
| 8,169,616 B2 | 5/2012 | Johnson et al. | |
| 9,354,165 B2 | 5/2016 | Simpkin et al. | |
| 9,964,396 B1 * | 5/2018 | Scott | G01J 3/0272 |

OTHER PUBLICATIONS

A. S. Sedra and K.C. Smith, Microelectric Circuits. 7th ed, Oxford, 2014. Chapter 2.7 "Effect of Finite Open-Loop Gain and Bandwidth on Circuit Performance," pp. 105-109. (Year: 2014).*
R.C. Jaeger and T.N. Blalock, Microelectronic Circuit Design. 3rd ed, McGraw Hill, 2006. Chapter 12.1 "Cascaded Amplifiers," pp. 703-705. (Year: 2006).*
H.W. Johnson and M. Graham, High-speed Digital Design, A Handbook of Black Magic. Prentice-Hall, Inc. 1993. Chapter 1 " Fundamentals" pp. 6-9, 24-35; Chapter 3 "Measurement Techniques," pp. 86-89; Chapter 4 "Transmission Lines," pp. 140-151. (Year: 1993).*
R. J. Baker, CMOS Circuit Design, Layout, and Simulation. 3rd ed, Wiley, 2010, pp. 220-223.
J. Karki, "Effect of parasitic capacitance in op amp circuits," Application Report, SLOA013A, Texas Instruments, Sep. 2000.
Texas Instruments, "Wideband, low distortion, medium gain, voltage-feedback operational amplifier," OPA843 datasheet, Dec. 2008.
Burr-Brown Products, "High precision operational amplifiers," OPA4277 datasheet, Apr. 2005.
R. A. Palmer, J. L. Chao, R. M. Dittmar, V. G. Gregoriou, and S. E Plunkett, "Investigation of time-dependent phenomena by use of step-scan FT-IR," Applied Spectroscopy, vol. 47, No. 9, pp. 1297-1310, 1993.
T.J. Johnson, A. Simon, J. M. Weil, and G. W. Harris, "Applications of time-resolved step-scan and rapid-scan FT-IR spectroscopy: dynamics from ten seconds to ten nanoseconds," Applied Spectroscopy, vol. 47, iss. 9, pp. 1376-1381, 1993.
C. Kotting, J. Guldenhaupt, and K. Gerwert, "Time-resolved FTIR spectroscopy for monitoring protein dynamics exemplified by functional studies of Ras protein bound to a lipid bilayer," Chemical Physics, vol. 396, pp. 72-83, Mar. 2, 2012.
Q. S. Hanley, "Fourier transforms simplified: computing an infrared spectrum from an interferogram," J. Chem. Educ., vol. 89(3), pp. 391-396, Jan. 26, 2012.
C. Leng, S. Pang, Y. Zhang, C. Cai, Y. Liu, and Y. Zhang, "Vacuum FTIR observation on the dynamic hygroscopicity of aerosols under pulsed relative humidity," Environ. Sci. Techno l., vol. 49(15), pp. 9107-9115, Jul. 10, 2015.
"Noise analysis ofFET transimpedance amplifiers," Application Bulletin, SBOA060, Burr-Brown, 1994.
"Improving ADC resolution by oversampling and averaging," Application Notes, AN118, Silicon Labs, Rev. Jul. 2013.
C. Basso, "Transient response counts when choosing phase margin," On Semiconductor, Nov. 2008.
S. A. Maas, Practical Microwave Circuits. Artech House, 2014, Chapter 1, pp. 1-11.

H. R. Kaupp, "Characteristics of micro strip transmission lines," IEEE Transactions on Electronic Computers, vol. EC-16, iss. 2, pp. 185-193, 1967.
S. Y. Poh, W. C. Chew, and J. A. Kong, "Approximate formulas for line capacitance and characteristic impedance of microstrip line," IEEE Transactions on Microwave Theory and Techniques, vol. 29, iss. 2, pp. 135-142, 1981.
D. Homentcovschi, "High accuracy formulas for calculation of the characteristic impedance of microstrip lines," IEEE Transactions on Microwave Theory and Techniques, vol. 43, iss. 9, pp. 2132-2137, 1995.
M. Zolog, D. Pitica, and L. Man, "Evaluation of the characteristic impedance of microstrip interconnect lines on printed-circuit-boards," 15th International Symposium for Design and Technology of Electronics Packages, (SIITME), pp. 167-172, 2009.
T. H. Hubing, T. P. Van Doren, and J. L. Drewniak, "Identifying and quantifying printed circuit board inductance," IEEE International Symposium on Electromagnetic Compatibility, pp. 205-208, 1994.
F. B. J. Leferink and M. J. C. M. van Doom, "Inductance of printed circuit board ground planes," IEEE International Symposium on Electromagnetic Compatibility, pp. 327-329, 1993.
"Grounding data converters and solving the mystery of AGND and DGND," Analog Devices, Tutorial MT-031, Rev. A, Oct. 2008, Kester et al.
"Decoupling techniques," Analog Devices, Tutorial MT-101, Rev. 0, Mar. 2009.
International Search Report and Written Opinion, PCT/US18/21113 for Apparatus and Method for Dark Voltage Removal for Enhancing Dynamic Range, Bandwidth, and Quality of Step-Scan Fourier Transform Infrared (FTIR) Spectroscopy Data. The Board of Regents for Oklahoma State University. (Jun. 1, 2018).
Available from: http://www.bruker.com/fileadmin/user_upload/8-PDFDocs/OpticalSpectrospcopy/FT-IR/VER TEX/Flyers/VER TEX80 80v _Flyer_ EN.pdf (Per the copyright notice of 2013, it is believed this publication was available as of 2013 which is sufficiently earlier than the effective filing date of the present application so that the particular month of publication is not in issue.).
W. Herres and J. Gronholz, "Understanding FT-IR Data Processing." (This document was believed to have been available as a publication around 1984-1986, which is sufficiently earlier than the effective filing date of the present application so that the particular month of publicatin is not in issue.).
"Photodiode characteristics and applications," www.osioptoelectronics. com Available from: www.osioptoelectronics.com/application-notes/ AN-Photodiode-Parameters-Characteristics.pdf (This document was believed to have been available as a publication around 2006, which is suficiently earlier than the effective filing date of the present application so that the particular month of publication is not in issue.).
N. S. Nise, Control Systems Engineering. 3rd ed. John Wiley & Sons, Inc, 2000. Chapter 4 "Time response", pp. 178-199.
R. Behzad, Design of Analog CMOS Integrated Circuits. Boston: McGraw-Hill, 2002.Chapter 8 "Feedback", pp. 247-249, 258-259.
T. H. Lee. The Design of CMOS Radio-Frequency Integrated Circuits. 2nd ed, Cambridge, 2004. Chapter 14 "Feedback Systems", pp. 441-445, 450-451.
G. A. Rincon-Mora, Analog IC Design with Low-Dropout Regulators. McGraw Hill, 2009. Chapter 4 "Negative Feedback", pp. 170-175.
S. Y. Liao, Microwave Devices and Circuits. Prentice-Hall, Inc. 1980. Chapter 3 "Transmission Lines and Microwave Waveguides", pp. 64-71.
S. A. Maas, The RF and Mircowave Circuit Design Cookbook. Artech House, 1998. Chapter 1 "Microwave Circuits and Circuit Elements", pp. 2-13.
"High Speed Analog Design and Application Seminar," Texas Instruments, section 5. (This document was believed to have been available as a publication around 2006, which is sufficiently earlier than the effective filing date of the present application so that the particular month of publication is not in issue.).
R. C. Jaeger, Introduction to microelectronic fabrication. Upper Saddle River, N.J.: Prentice Hall, 2002. Chapter 4.7 "Sheet Resistance", pp. 66-67.

(56) References Cited

OTHER PUBLICATIONS

Analog Devices, "1ppm 20Bit, ±1 LSB INL, voltage output DAC," AD5791 datasheet. Rev. D. (This document was believed to have been available as a publication around 2010-2013, which is sufficiently earlier than the effective filing date of the present application so that the particular month of publication is not in issue).

* cited by examiner

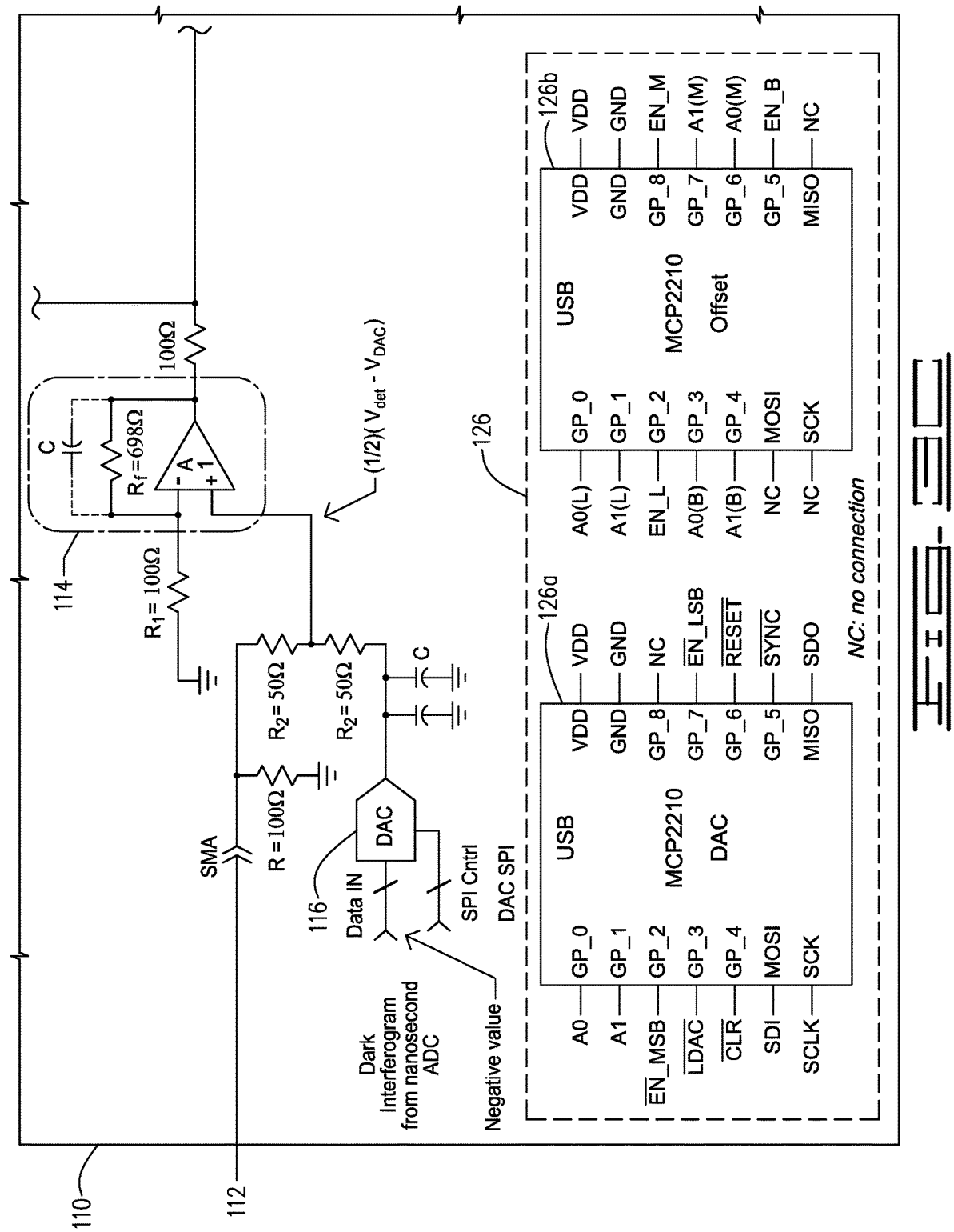

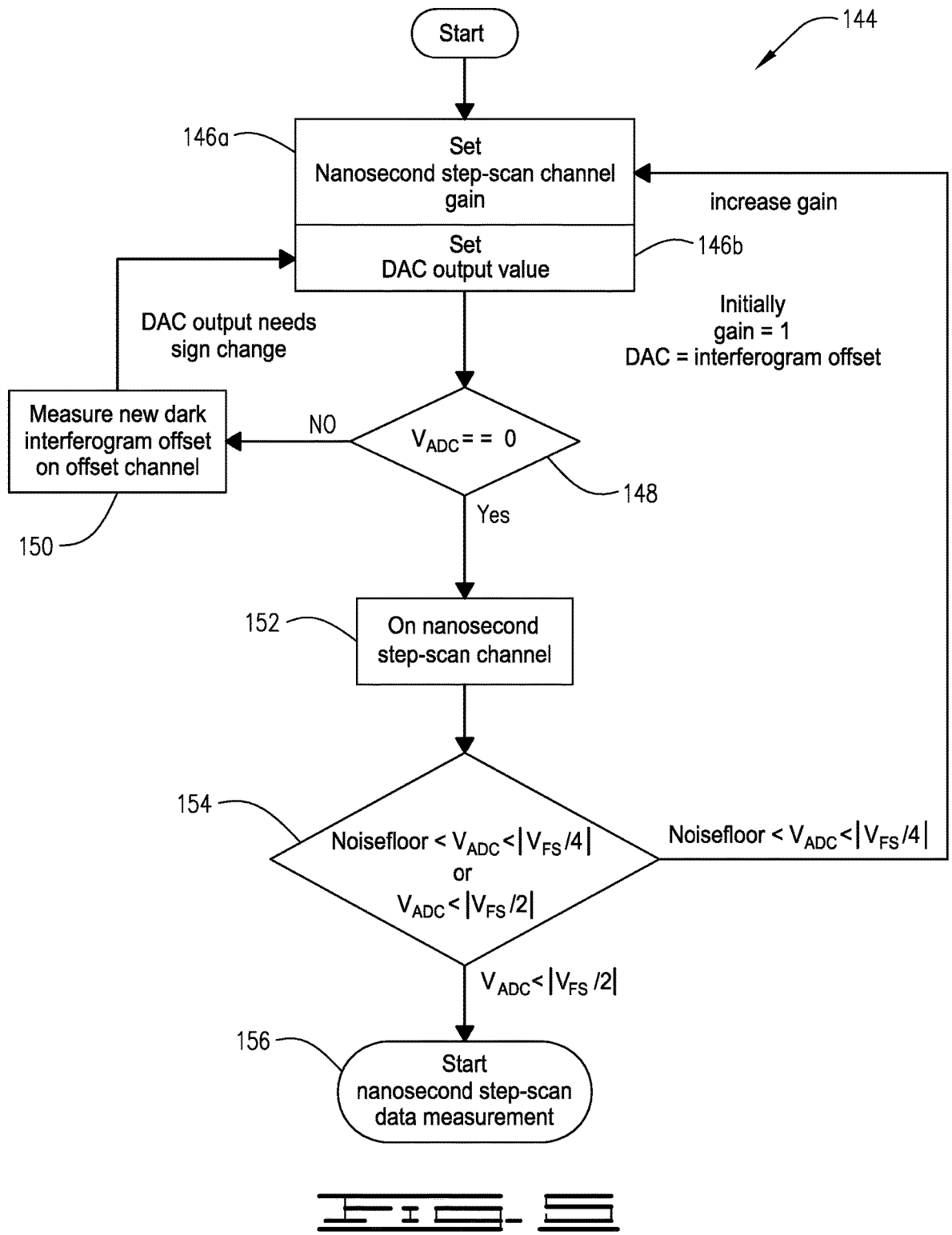

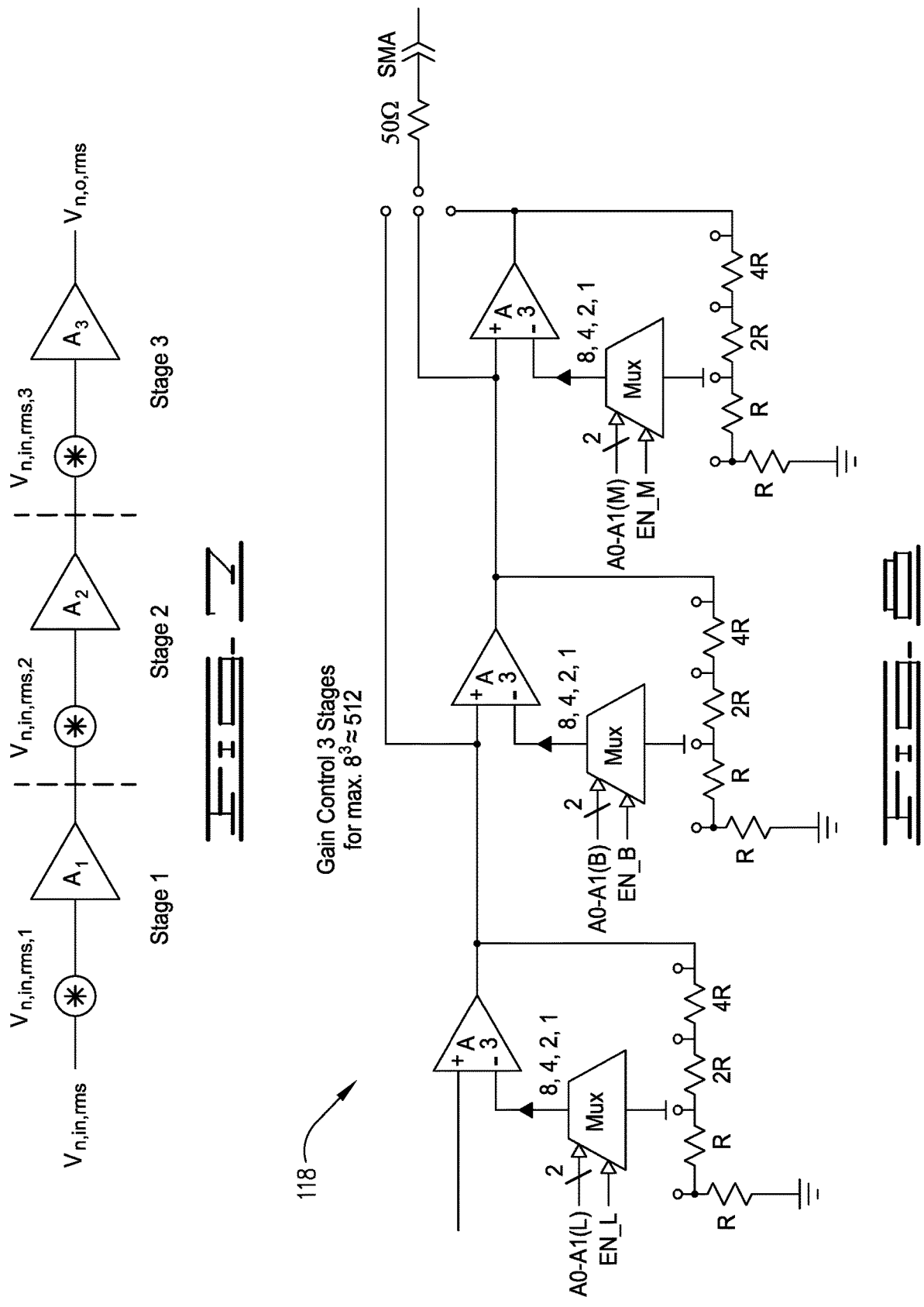

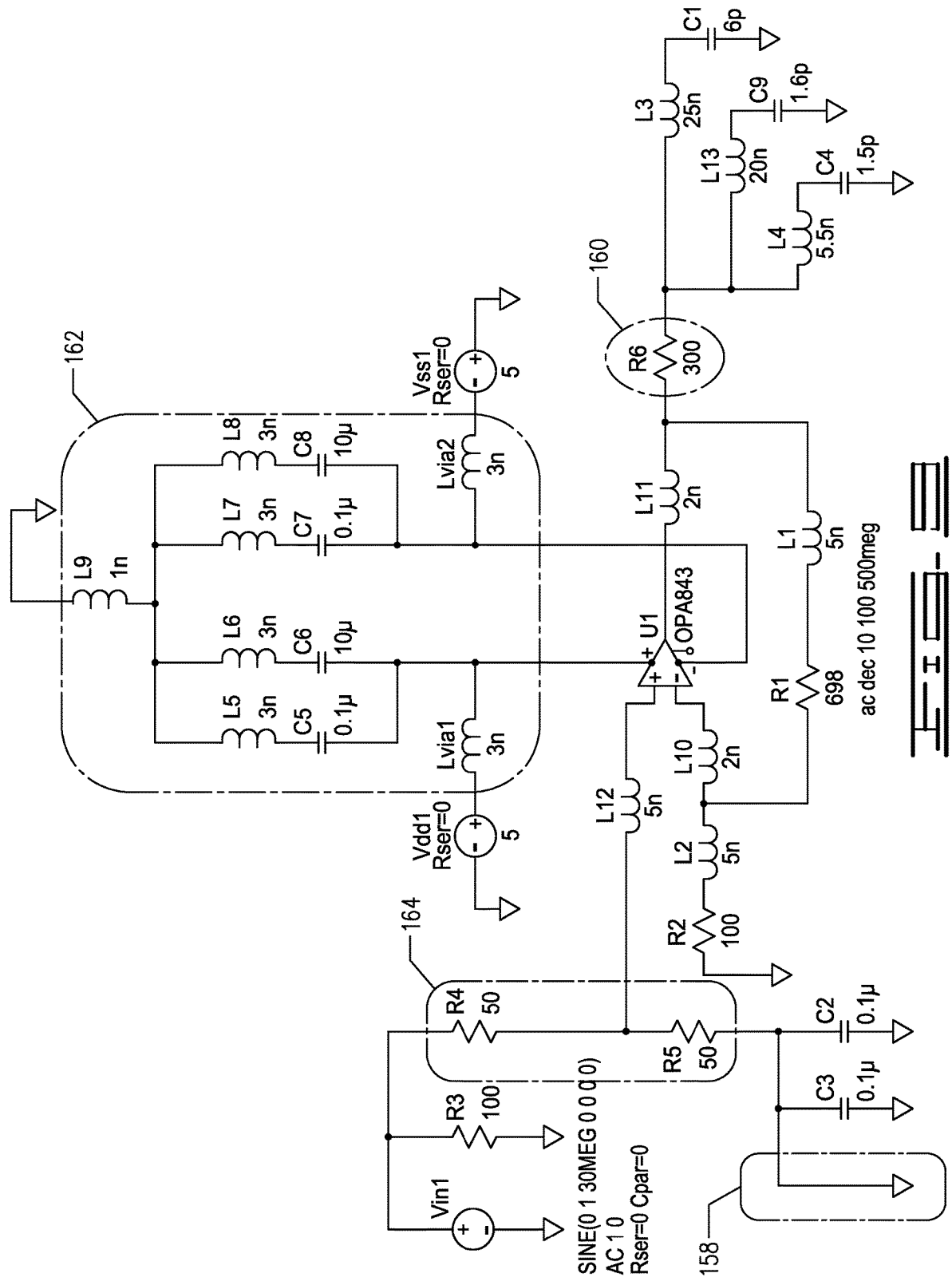

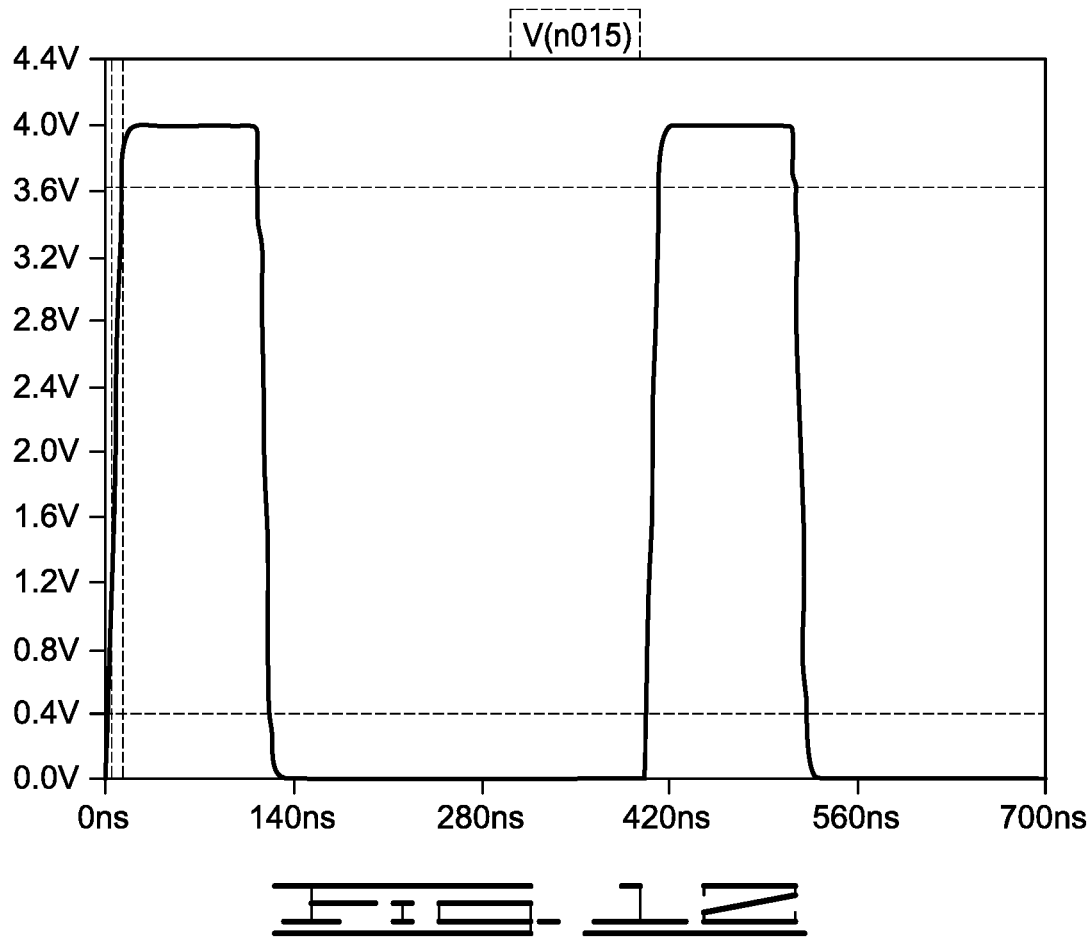
FIG. 12
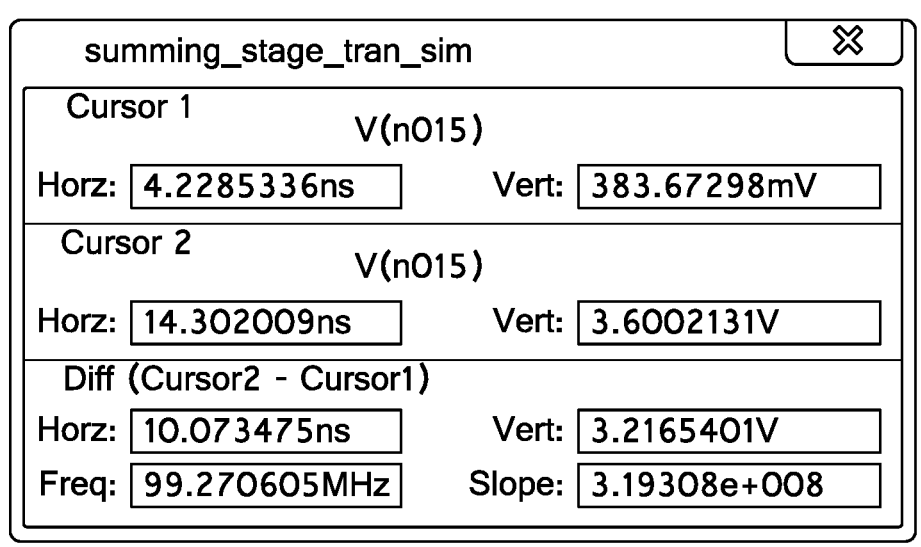
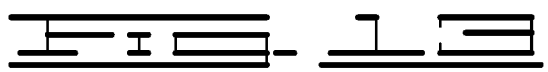

APPARATUS AND METHOD FOR DARK VOLTAGE REMOVAL FOR ENHANCING DYNAMIC RANGE, BANDWIDTH, AND QUALITY OF STEP-SCAN FOURIER TRANSFORM INFRARED (FTIR) SPECTROSCOPY DATA

CROSS-REFERENCE TO RELATED APPLICATIONS

This application is a national phase entry of PCT Application No. PCT/US2018/021113 entitled APPARATUS AND METHOD FOR DARK VOLTAGE REMOVAL FOR ENHANCING DYNAMIC RANGE, BANDWIDTH, AND QUALITY OF STEP-SCAN FOURIER TRANSFORM INFRARED (FTIR) SPECTROSCOPY DATA filed Mar. 6, 2018, which claims priority from U.S. Provisional Patent Application Ser. No. 62/467,564 filed Mar. 6, 2017, the entirety of the disclosures of which are each incorporated herein by reference.

STATEMENT REGARDING FEDERAL SPONSORED RESEARCH OR DEVELOPMENT

This invention was made with U.S. Government support under NSF Grant No. DBI-1338097 awarded by the National Science Foundation. The U.S. Federal Government has certain rights in this invention.

TECHNICAL FIELD

This disclosure relates generally to the acquisition of Fourier Transform Infrared (FTIR) data and, more particularly, to systems and methods for enhancing the dynamic range, bandwidth, and quality of FTIR spectroscopy data.

BACKGROUND

FTIR spectroscopy is an advanced form of infrared (IR) spectroscopy that is used for identification of unknown materials. Its application covers many disciplines offering multiple opportunities such as environmental, food industry, pharmaceuticals, material science and forensics. In IR spectroscopy, IR radiation is passed through a or reflected from a sample. Portions of the IR radiation are absorbed by the sample and some are transmitted through the sample or reflected by reaching a photodetector. The resulting spectrum represents the molecular absorption and transmission property of the sample. Since the spectrum is unique to each molecular structure it's spectrum can be used as an identifier to that structure. For example, some advantages of an FTIR spectrometer include: high spectral resolution; high sensitivity; the ability to accept weak signals resulting in a high output Signal-to-Noise-Ratio (SNR); high spectral accuracy; ability to measure all infrared frequencies simultaneously; use of microgram sample size; and observation of real-time chemistry.

A typical arrangement and operation of a time-resolved FTIR spectrometer is as follows: a light source, usually an infrared source, typically a globar, a black body radiator, and a laser source. IR light passes through an aperture, generally e.g., 0.25 millimeters (mm)-12 mm before entering a Michelson interferometer. The Michelson interferometer includes a beam splitter (BMS), a fixed mirror, and a movable mirror. The fixed and movable mirrors cause interference of the infrared beam after leaving the beam splitter. The interference pattern is associated with different mirror positions. After the IR light beam leaves the interferometer it passes through the sample chamber. The sample chamber can additionally be irradiated with laser light. Finally, the IR light reaches a liquid nitrogen cooled MCT (mercury, cadmium and telluride) detector. Any FTIR spectrometer used in connection with the present disclosure is not limited to such MCT detector. The detector measures the light intensity I(x) with respect to different mirror positions. The result is referred to as an interferogram. After performing a Fourier transform on the interferogram, one can obtain the transmission or absorption spectra.

For example, current time-resolved FTIR spectroscopy allows for the ability to monitor the temporal progress of a sample to obtain information about a sample's structural and/or chemical changes as well as kinetics. However, existing technology and methodologies for FTIR spectroscopy are lacking in that in order to obtain all the structural/changes and kinetics. As a result multiple experiments must be conducted and the data and time of observation needed are not necessarily compatible or accurate. However, such would be preferred in many instances. The changes to be observed are very small and not easily obtainable in a continuous or accurate manner with existing technology and methodologies. Stated differently, the dynamic or time varying FTIR signal of interest is not able to be fully observed due to the existence of a large dark current interferogram baseline taking the form of a static or DC (direct current) value making it difficult to detect and observe the very small changes (e.g. low amplitude) of interest occurring in the FTIR signal. As FTIR signals are presently processed, any effort to amplify the dynamic FTIR of interest are distorted, e.g., clipped by the amplifier supply rails.

SUMMARY

The presently disclosed apparatus, systems, methods, techniques, and algorithms provide a signal conditioning module that enables continuous measurement in order to monitor temporal progress of a sample for a longer duration of time, eliminates the need to perform multiple experiments and attempt to patch the results together, enables the removal of dark current with greater accuracy, provides access to previously unobtainable dynamic IR spectral information, and also enhances the resolution and observation of the now accessible and obtainable IR spectral information. Stated differently, the presently disclosed apparatus, systems, methods, techniques, and algorithms provide a signal conditioning module that enables the detection of small-scale signals and has low noise, high gain, improved resolution, resulting in a wider dynamic range suitable for use in nanosecond step-scan FTIR spectroscopy.

For purposes of simplicity, the present disclosure is discussed in connection with nanosecond step-scan FTIR spectroscopic data collection; however such is also suitable for microsecond step-scan FTIR spectroscopic data collection as well. The presently disclosed apparatuses, systems, methods, techniques, and algorithms enable the removal of dark interferogram voltages, amplification of dynamic signals in DC mode, and avoid limited AC signal dynamic range and possible bandwidth. The presently disclosed apparatuses, systems, methods, techniques, and algorithms provide nanosecond (or microsecond) step-scan FTIR data collection technology and techniques for continuous data collection, e.g. nanoseconds to minutes, thus providing a major advancement to existing nanosecond (or microsecond) FTIR technologies and techniques that are not capable of collecting step-scan FTIR data after a few milliseconds following stimulation.

A method comprising obtaining a dark interferogram offset voltage of a sample for a mirror position is disclosed. The method includes performing a nanosecond step-scan measurement by exposing the sample to a laser flash (or other stimuli) for the mirror position to obtain a step-scan interferogram for the mirror position; and creating a resulting signal of interest for the mirror position by removing the dark interferogram offset voltage of the sample (e.g. a voltage representation of the dark baseline sample) from the obtained step-scan interferogram for the mirror position. The resulting signal of interest may also be referred to as a residual signal or the differential signal and the like.

A signal conditioning module configured to remove dark current from an interferogram during a nanosecond step-scan measurement and thereby enhance time-resolved Fourier transform infrared (FTIR) spectroscopy data is disclosed. The signal conditioning module comprises a summation subcircuit, wherein the summation subcircuit receives input from a FTIR spectrometer representative of time-resolved FTIR spectroscopy data in the form of an interferogram during a nanosecond step-scan measurement of an FTIR spectrometer, and removes a dark interferogram offset voltage from the received interferogram to produce a resulting residual signal of interest during the nanosecond step-scan measurement of an FTIR spectrometer (e.g. the difference between the sum of the dark and dynamic FTIR minus the dark baseline FTIR). At this point all interferogram currents are converted to voltages for signal processing convenience. The signal conditioning module further includes a dark interferogram offset channel amplification subcircuit operably connected with the summation subcircuit and a computing system, wherein the dark interferogram offset channel amplification subcircuit measures the dark interferogram offset voltage. The signal conditioning module further includes a nanosecond step-scan channel amplification subcircuit operably connected to the summation subcircuit, wherein the nanosecond step-scan channel amplification channel subcircuit receives the resulting residual signal of interest and amplifies the resulting residual signal of interest to produce an amplified resulting residual signal of interest. Specifically, the dynamic FTIR signal terms.

A method comprising exposing a sample to infrared radiation (or other similar stimulus or any stimuli that results in a change of material state of a sample) over a progressive range of mirror positions to obtain absorption values of the sample over the progressive range of mirror positions. The method further includes the step of interpreting the infrared radiation absorption values of the sample over the progressive range of mirror positions to obtain a dark interferogram offset voltage (static or DC) value for each mirror position over the progressive range of mirror positions. The method further includes the step of performing a nanosecond step-scan by exposing the sample to stimulus, e.g. a laser flash or other stimulus, to obtain a step-scan interferogram over the progressive range of mirror positions; and interpreting the nanosecond step-scan interferogram for each mirror position over the progressive range of mirror positions by subtracting the dark interferogram offset voltage value for each mirror position over the progressive range of mirror positions to obtain the resulting signal of interest.

BRIEF DESCRIPTION OF THE DRAWINGS

FIGS. 3A-3C is an example schematic for a signal conditioning module.

FIG. 5 is an example program flow chart for nanosecond step-scan measurement.

FIG. 6 is an example schematic for a nanosecond step-scan channel amplification subcircuit of the signal conditioning module depicted in FIG. 3B.

FIG. 7 is a simplified diagram illustrating noise of cascading amplifiers.

FIG. 8 is an example schematic for a dark interferogram offset channel amplification subcircuit of the signal conditioning module depicted in FIG. 3A.

FIG. 9 is an example schematic of a simulation of summing subcircuit of signal conditioning module.

FIG. 12 illustrates a transient response waveform of the simulation summing subcircuit of FIG. 9.

FIG. 13 illustrates a screen image of transient response data of the summing subcircuit of FIG. 9.

DETAILED DESCRIPTION

Figure 1:
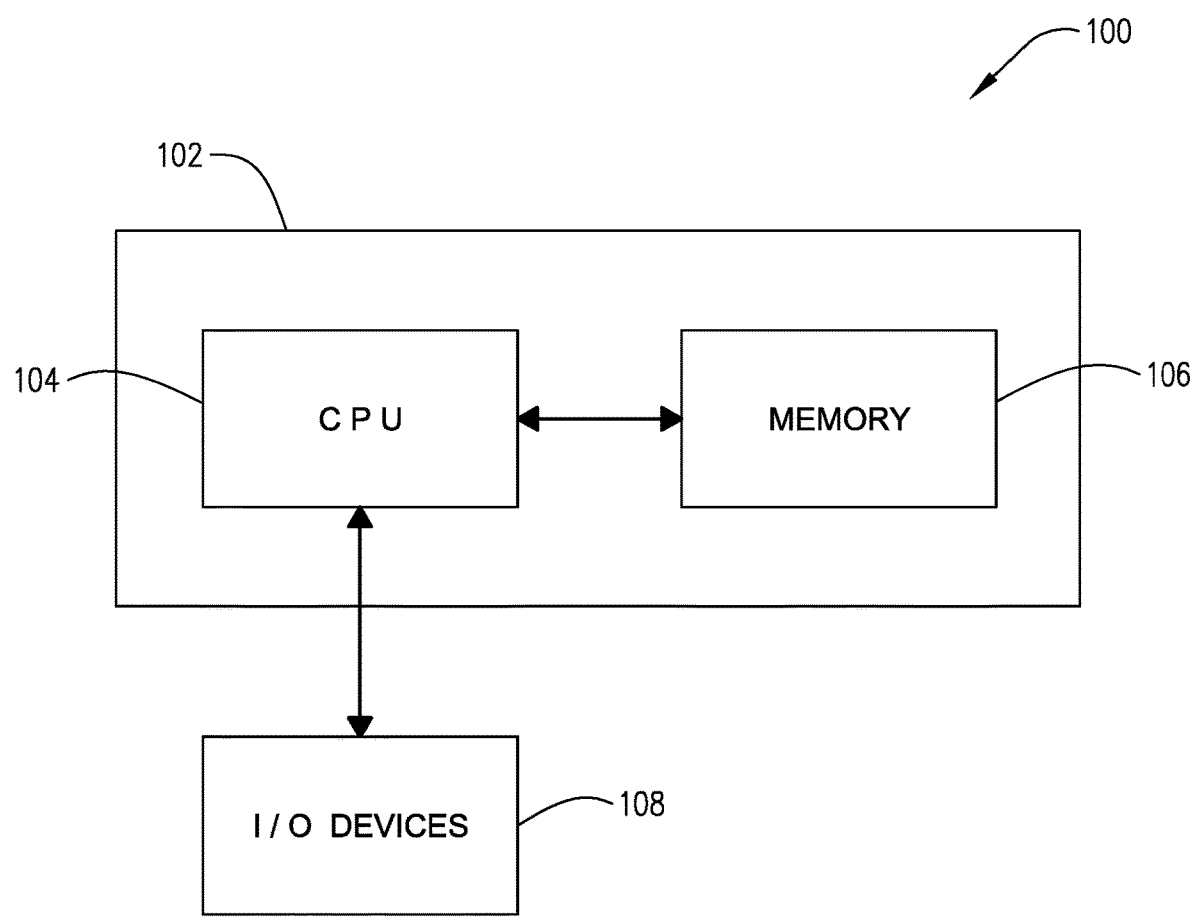
FIG. 1 is a simplified block diagram that shows an example of a computing system suitable for use in connection with one or more embodiments of the present disclosure.

Before further explanation of the presently disclosed inventive concepts, systems, apparatus, techniques, methods, and algorithms by way of exemplary description, drawings, experimentation, and results, it should be understood that the presently disclosed inventive concepts, systems, apparatus, techniques, methods, and algorithms are not limited in application to the details of construction and the arrangement of the compositions, configurations, formulations, steps, and/or components set forth in the present disclosure or illustrated in the drawings, examples, experiments, and/or results. The presently disclosed inventive concepts, systems, apparatus, techniques, methods, and algorithms are capable of other embodiments or of being practiced or carried out in various ways. Accordingly, the language used in the present disclosure is intended to be given the broadest possible scope and meaning and The present disclosure is not limited to the disclosed arrangement of components or circuitry. It should also be appreciated that circuitry configurations, whether implemented in discrete components, in software, or combinations thereof, that achieve the same results and functionality described herein are also suitable and do not depart from the spirit and scope of the present disclosure e.g. dual of a single signal conditioning channel modified dynamically for each pass.

The terms of approximation, including, "generally," "substantially," "about," "approximately," and the like, and each of their respective variants and derivatives will be understood to allow for minor variations and/or deviations that do not result in a significant impact thereto. Such terms of approximation should be interpreted according to their ordinary and customary meanings as used in the associated art unless indicated otherwise. Absent a specific definition and absent ordinary and customary usage in the associated art, such terms should be interpreted to be ±10% of the base value. The use of ordinal number terminology (i.e., "first," "second," "third," "fourth," etc.) is for the purpose of differentiating between two or more items and is not meant to imply any sequence or order or importance to one item over another or any order of addition. The term "or combinations thereof" as used herein refers to all permutations and combinations of the listed items preceding the term. The skilled artisan will understand that typically there is no limit on the number of items or terms in any combination, unless otherwise apparent from the context.

As will be used herein, directional terms, such as "above," "below," "upper," "lower," "top," "left", "right", etc. are used for convenience in referring to the accompanying drawings and descriptions thereof and are not intended to limit the scope of the appended claims.

For purposes of the present disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit or a range having no lower limit, depending upon the variable being defined). For example, "at most 4" means 4 or less than 4, and "at most 40%" means 40% or less than 40%.

For purposes of the present disclosure, when a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

As previously stated, the presently disclosed apparatus, systems, methods, techniques, and algorithms provide a signal conditioning module that enables the ability for continuous measurement in order to monitor temporal progress of a sample for longer durations of time, eliminates the need to perform multiple experiments or sample readings and attempt to patch the results together, enables the removal of dark current with greater accuracy, provides access to previously unobtainable IR spectral information data, and also enhances the resolution and observation of the now accessible and obtainable IR spectral information data.

As will be further described herein in greater detail, the signal conditioning module and associated methods and techniques therewith is capable of enhancing FTIR signal resolution. For example, in certain FTIR spectroscopy applications, the resulting signal may contain a large baseline, e.g. a direct current (DC) baseline, and the data of interest within the resulting signal is a small fraction of the complete signal. In current apparatuses, techniques, and methods, due to the large DC baseline, such details from the portion of the signal that are of interest, which is generally information with a low amplitude, are clipped or otherwise lost. The present disclosure provides an improvement as the disclosed apparatuses, methods, and techniques are capable of measuring the large DC baseline or "static" FTIR signal (which will be referred to herein as the dark interferogram offset voltage or dark current) and removing the same from the FTIR signal of interest with microvolts (μV) accuracy. As will be discussed further in association with the examples, the electronic subtraction of the baseline may be followed by a wideband fast settling with variable gains from 2 to 512 in steps provides unprecedented access to FTIR signals which can be enhanced by a factor greater than 10 to 500.

For example, as will be further described herein, a signal conditioning module 110 suitable for use in achieving the described functionality and results is disclosed. Signal conditioning module 110 may include a dark interferogram offset channel amplification subcircuit 118, a nanosecond step-scan channel amplification subcircuit 120, a summing or summation subcircuit 114. Signal conditioning module 110 is operably connected to a computing system 100, wherein computing system 100 has one or more processors having instructions thereon to carry out or enable one or more steps to achieve the described functions and results, including controlling and adjusting gains for one or more subcircuit, and enabling the subtraction or removal of the dark interferogram offset voltage from the FTIR interferogram of interest. Summing subcircuit 114 enables the removal of the dark interferogram offset voltage from the FTIR interferogram of interest. Voltage ranging from volts to microvolts may be removed from the FTIR interferogram of interest thereby leaving a resulting residual signal of interest. This resulting residual signal of interest may be amplified, for example, with the nanosecond step-scan channel amplification subcircuit 120.

The disclosed signal conditioning module and associated techniques provide an improvement in time-resolved step-scan FTIR spectroscopy accuracy and maintain nanosecond settling time and enable unprecedented access to portions of FTIR spectroscopy data with greater accuracy and detail as a result of the removal of the large DC component.

FIG. 1 is a simplified block diagram for a computing system 100 suitable for implementing and performing the methods and techniques described herein. Computing system 100 includes a computing device 102 operably connected to one or more input/output (I/O) devices 108. Computing device 102 is representative of various forms of computing devices, including desktops, laptops, workstations, FTIR spectrometer processors, servers, mobile devices, such as personal digital assistants, tablets, smartphones, cellular telephones, and other similar computing devices.

Computing device 102 includes a central processing unit (CPU) 104. CPU 104 includes one or more processors reading and/or executing instructions, programs, and applications stored in memory 106 and/or computer readable storage media of I/O devices 108, and accessing and/or storing data in memory 106 and/or computer readable storage media of I/O devices 108. CPU is operably connected with memory 106. CPU 104 is also operably connected with I/O devices 108 through an applicable interface component for the corresponding I/O device 108, e.g. port (serial, parallel USB), wire, card (sound, video, network), and the like. Exemplary types of CPU 104 may include general purpose processors, digital programmable devices, microcontrollers, digital signal processors (DSPs), application specific integrated circuit (ASIC), and field programmable gate array (FPGA), or other components and combinations thereof designed to perform the functions described herein.

Memory 106 includes data storage, volatile memory, e.g. random access memory (RAM), and non-volatile memory, e.g. read only memory (ROM).

I/O devices 108 include various devices that a user may use to interact with the computing device 102. Representative I/O devices 108 include keyboards, touchscreens, mouse and other pointing devices; a visual display device, such as a cathode ray tube, liquid crystal display, screens, and other suitable display devices for visually communicating and interacting with the user; audio devices, such as a microphone, headphones, speakers; and print devices for printing, scanning, faxing, and/or receiving and/or transmitting data and images. I/O devices 108 may also include computer readable storage media, e.g. mass storage devices, disks, magnetic disks, optical disks, magnetic tape, flash memory, RAM, ROM, EEPROM, or any other media that can be used to carry or store computer-readable information. I/O devices 108 may also include a communication device for connecting computing system 100 with one or more other devices, e.g. the presently disclosed signal conditioning module 110, an FTIR spectrometer, and/or computing systems over a network, e.g. wired and/or wirelessly, utilizing one or more communications protocols, e.g. IEEE 802.11, IEEE 802.3, TCP/IP, cellular protocols, any other communications protocols, and combinations thereof.

Computing system 100 may include one or more I/O devices 108 of the same type or of different types and combinations thereof and one or more computing devices 102 of the same type or of different types and combinations thereof may be operably connected to each other and cooperating together to carry out the methods, functions, and techniques described herein.

The functions, methods, techniques, or algorithms described herein may be implemented in hardware, software, firmware, or any combinations thereof. When implemented in software, the described methods, functions, techniques, and algorithms may be stored in memory, computer-readable storage media, and/or combinations thereof and transmitted as one or more instructions or code to cause CPU 104 to operate in accordance with the methods, functions, techniques, and teachings of the present disclosure. The operable connection of the various components of computing system 100 described in reference to FIG. 1 may include buses, circuitry, wires, wireless, or other similar connections. The methods, functions, techniques, and algorithms described herein may be implemented by one or more computing systems 100 in cooperation with each other. The components of system 100 shown and described including their relationships and functions, are exemplary and are not to limit the implementation of the systems, methods, and techniques described herein.

Although the present figures illustrate the signal conditioning module 110 as being separate, discrete, and/or analog components from computing system 100, such illustration should not be limiting on the appended claims. The apparatus, methods, and techniques described herein may also be implemented entirely or partially in one or more computing systems 100 cooperating together, and any combinations thereof. Computing system 100 may be used in connection with a FTIR spectrometer (not depicted), or may be the computing system of a FTIR spectrometer.

Figure 2A:
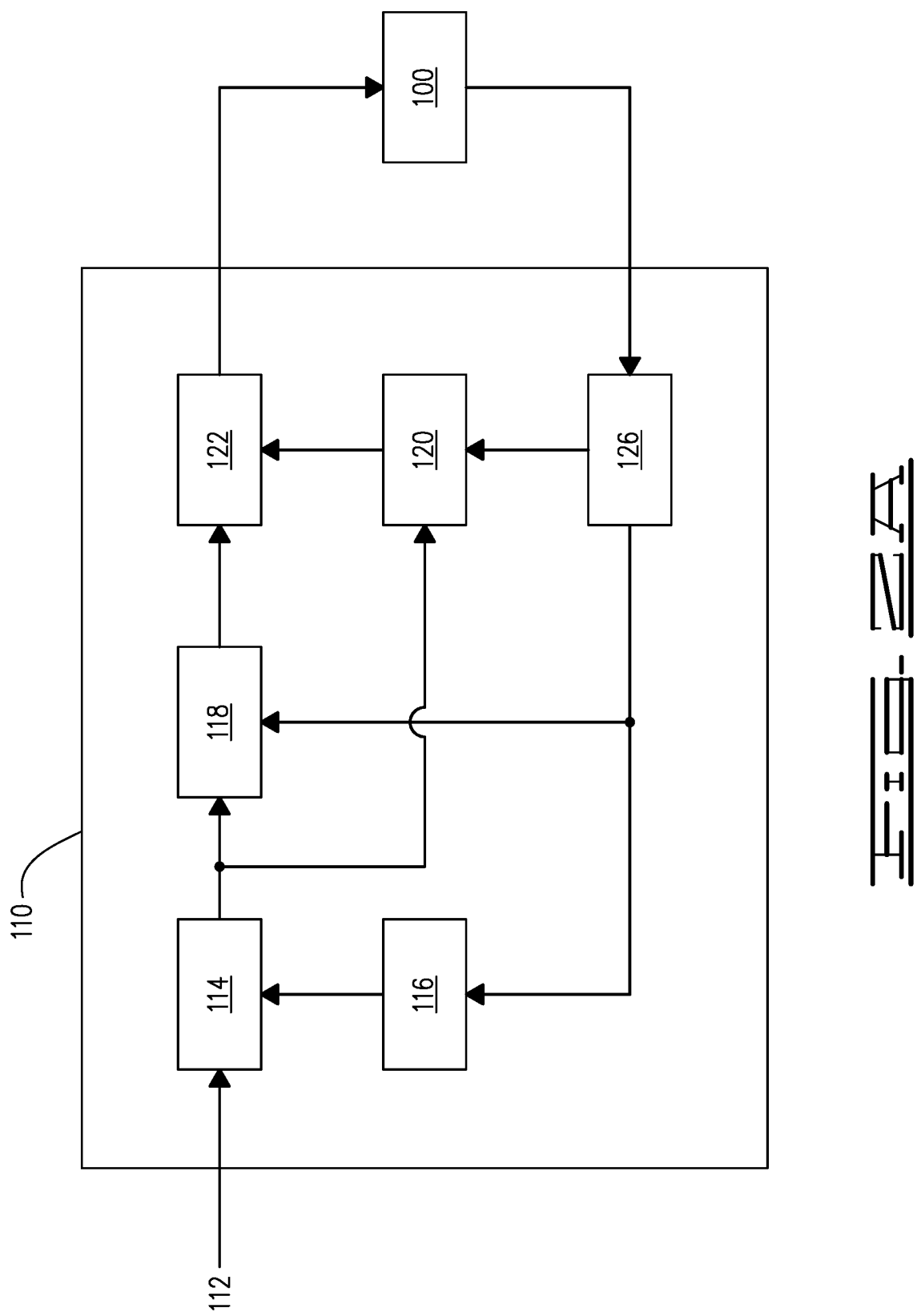
FIG. 2A illustrates a simplified block diagram of a signal conditioning module.
Figure 2B:
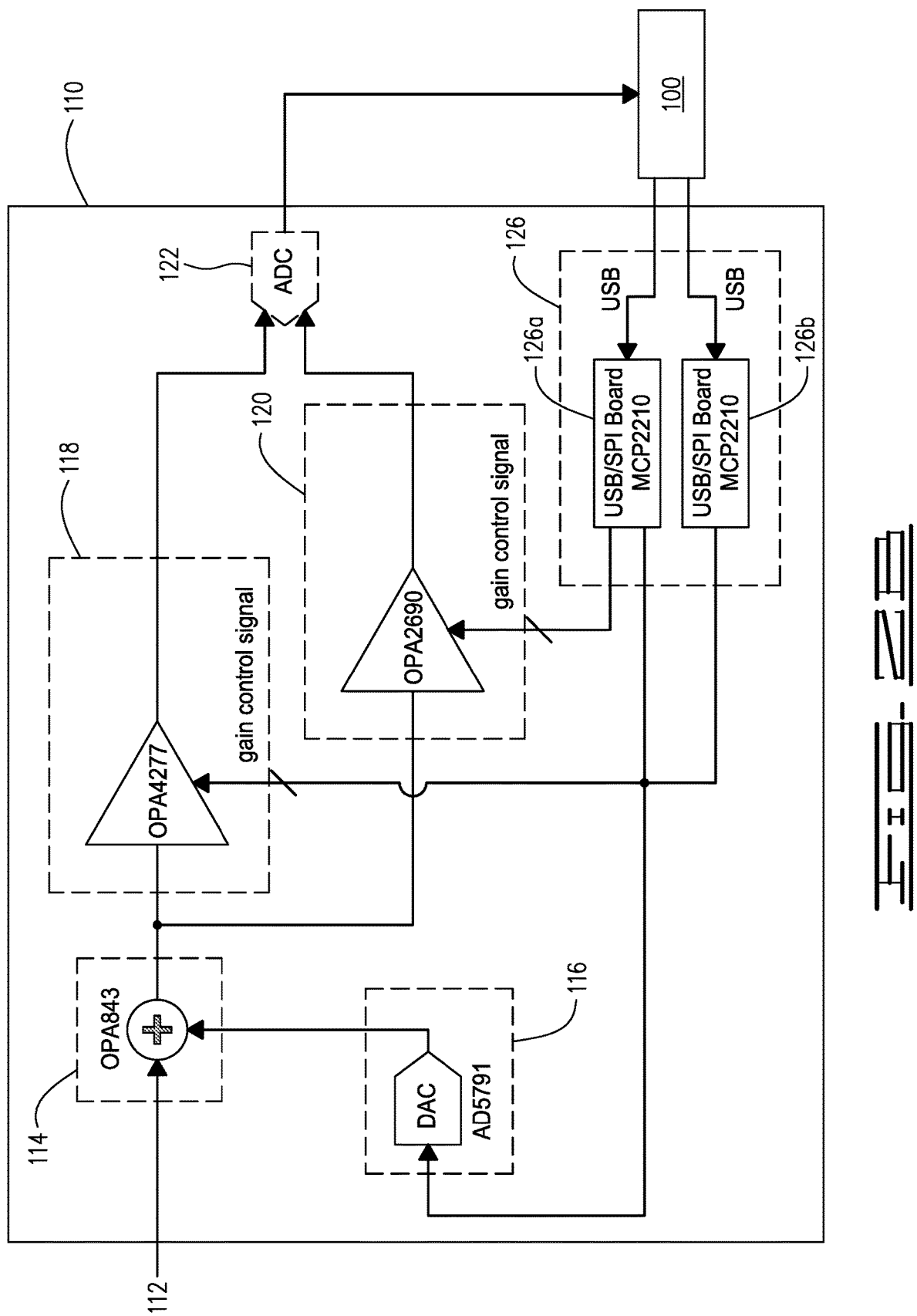
FIG. 2B is a more detailed view of the simplified block diagram of FIG. 2A.
Figure 3A:
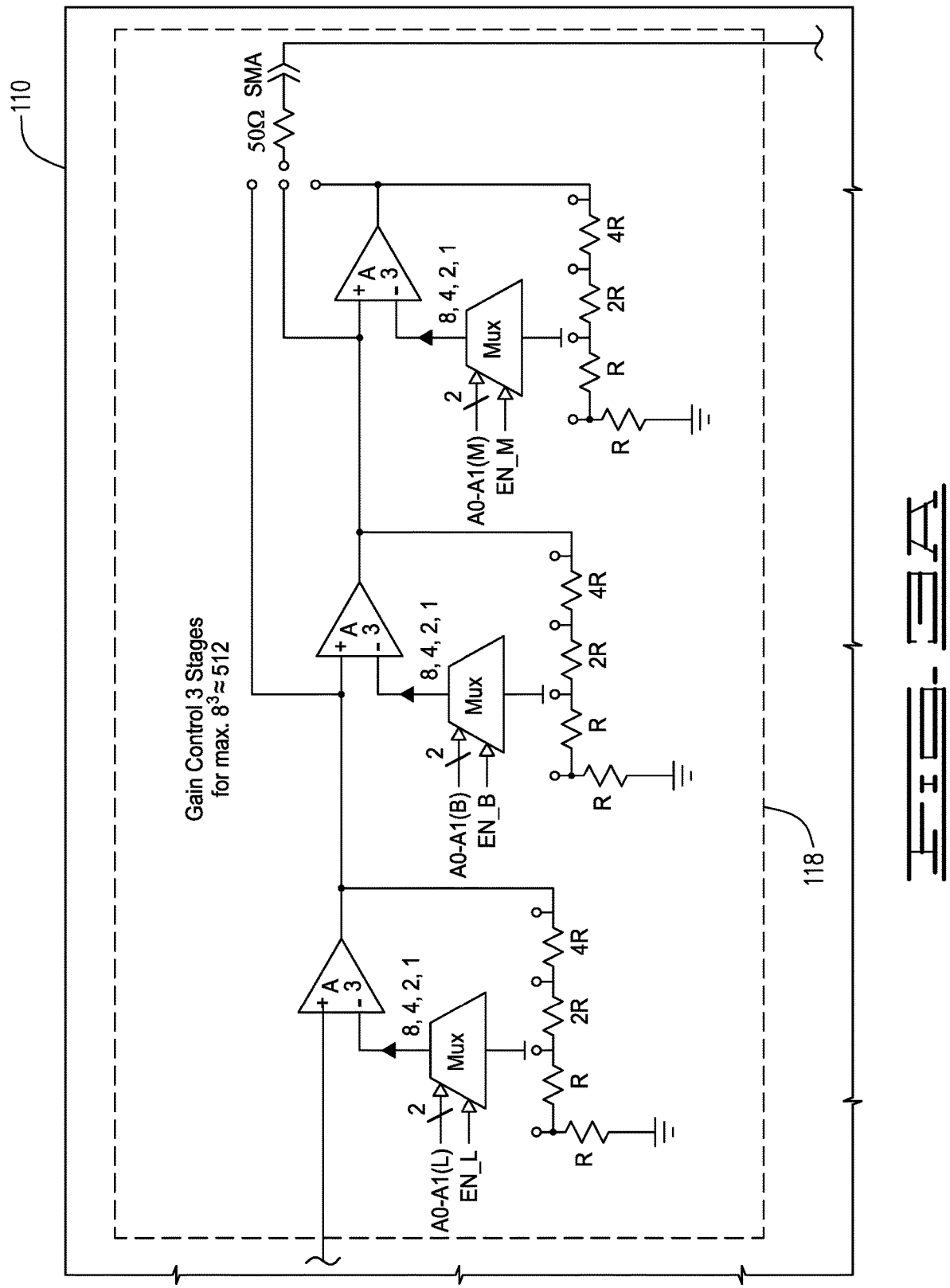
Figure 3B:
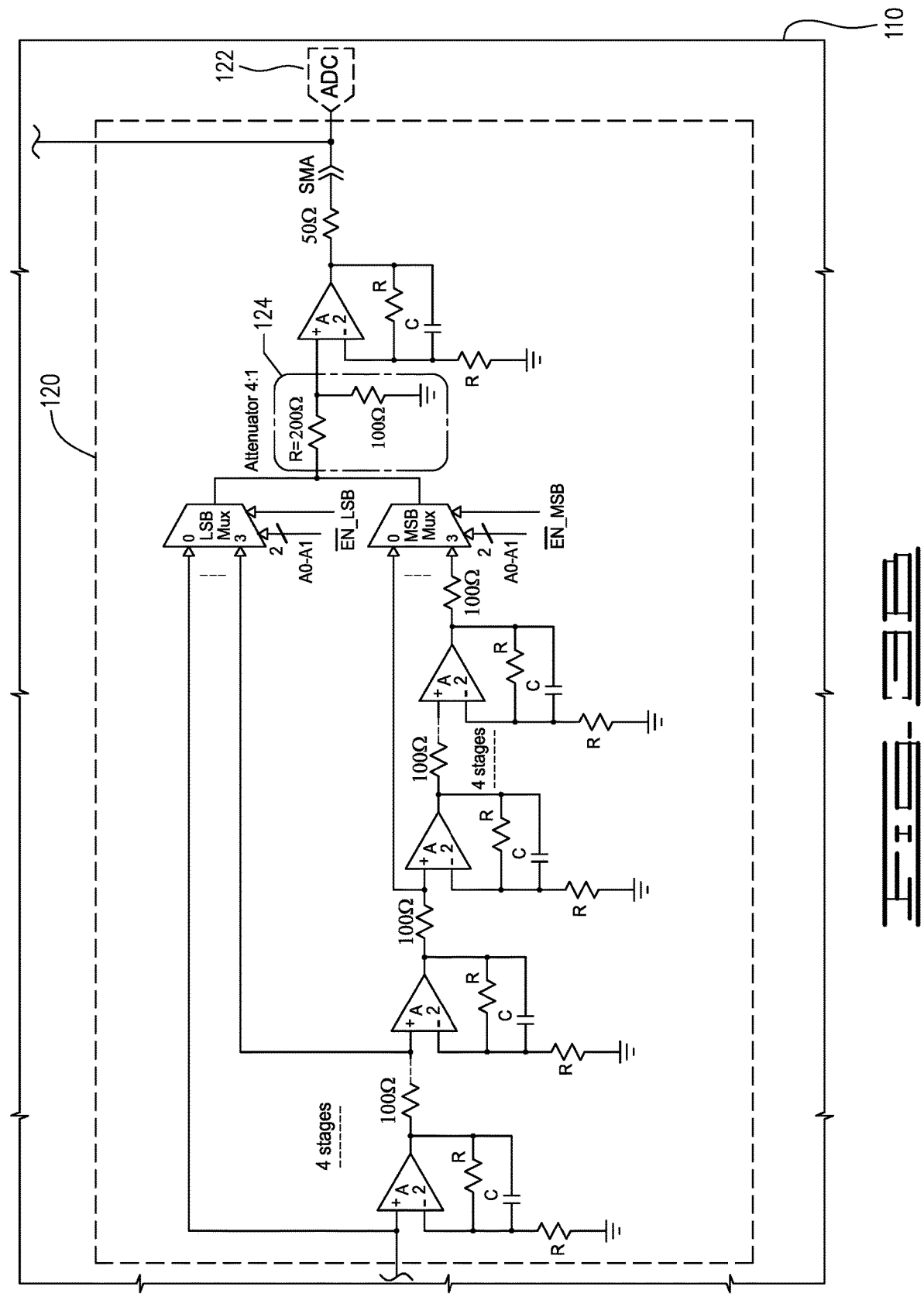

FIG. 2A illustrates a simplified block diagram of a signal conditioning module 110. FIG. 2B is a more detailed view of the simplified block diagram of signal conditioning module 110 depicted in FIG. 2A. FIGS. 3A-3C depict a non-limiting example schematic for signal conditioning module 110 that will be discussed herein and in connection with the examples later in this disclosure.

Signal conditioning module 110 receives signal 112 from a detector of an FTIR spectrometer (not depicted). Signal 112 is an interferogram of a sample. Prior to being provided to signal conditioning module 110, signal 112 may go through a transimpedance amplifier (TIA), not depicted, used in connection with photodetector.

Signal conditioning module 110 enables the removal of a dark interferogram offset voltage of a sample for a given mirror position. In order to do so, signal conditioning module 110 in cooperation with computing system 100, obtains a dark interferogram offset voltage for a sample. The dark interferogram offset voltage is obtained when a sample is under infrared radiation, without stimulus, e.g. laser flash, applied to the sample in the FTIR spectrometer. While infrared radiation is disclosed as being the source of a stimulus to obtain the dark interferogram offset voltage, other similar stimulus or any stimuli resulting in a change of material state that is to be measured is also contemplated by the present disclosure. For ease of discussion, IR radiation is used. The measured dark interferogram offset voltage is stored in computing system 100 for use in connection with creating a resulting residual or dynamic signal of interest during nanosecond step-scan FTIR measurement.

The dark interferogram offset voltage is obtained for each mirror position over a progressive range of mirror positions of the FTIR spectrometer, in part, with dark interferogram offset channel amplification subcircuit 118, summing subcircuit 114, USB/SPI communication subcircuit 126, and computing system 100, working in operable cooperation together. Dark interferogram offset channel amplification subcircuit 118 may be configured such that it requires a low intrinsic offset and low noise performance, and has a low frequency variable gain channel subcircuit that is programmable in powers of 2 from 2 to 512 in order to ensure that the resulting output signal falls within a suitably high dynamic range of ADC to maximize the SNR of all signals.

As shown in FIG. 3A and FIG. 8, an example schematic of dark interferogram offset channel amplification subcircuit 118 is shown. Dark interferogram offset channel amplification subcircuit 118 is depicted as three cascaded noninverting operational amplifier stages. Each stage of this example is configured to have software controllable gain settings of unity, 2, 4, and 8. For example, maximum channel gain for dark interferogram offset channel amplification subcircuit 118 is 512. The programmable gain can be achieved by using a multiplexer, e.g., DG409 manufactured by Vishay Intertechnology, Inc., to alter the feedback factor resistance. The amplifier used in the dark interferogram offset channel amplification subcircuit 118 depicted in the figures is an OPA4277 chip by Burr-Brown Products. The OPA4277 is a high precision operational amplifier with low input offset voltage of typically ±20 µV.

Signal conditioning module 110 includes nanosecond step-scan channel amplification subcircuit 120 depicted in FIGS. 2A, 2B, 3B and 6. Nanosecond step-scan channel amplification subcircuit 120 may be configured such that it requires short settling time and low noise performance. Nanosecond step-scan channel amplification subcircuit 120 may be configured such that it has a programmable gain to ensure its output signal falls within a suitably high dynamic range of ADC to maximize the SNR of all signals. The output signal of nanosecond step-scan channel amplification subcircuit 120 is generally referred to as the resulting signal of interest. The resulting signal of interest may be amplified, for example, with the nanosecond step-scan channel amplification subcircuit 120, for example, which may be configured to be a 20 Mega Hertz (MHz) low noise subcircuit in steps of 2 from 2 to 512.

The resulting signal of interest is the nanosecond step-scan interferogram obtained during a step-scan measurement of an FTIR spectrometer for each mirror position over a progressive range of mirror positions after a sample has undergone stimulus, e.g. laser flash and the like, exposure and the dark current interferogram offset voltage for the corresponding mirror position and, optionally, any electronic or intrinsic offset voltage, are removed from the nanosecond step-scan interferogram. The method for obtaining the resulting signal of interest will be described below in reference to FIGS. 4 and 5.

For example, as depicted in FIG. 3B and FIG. 6, nanosecond step-scan channel amplification subcircuit 120 includes seven cascaded noninverting amplifiers each with a stage gain of 2. Each stage output can be selected via two 4 to 1 multiplexers providing incremental gains of unity, 2, 4 . . . 128 to a 16 bit 130 mega samples per second (Msps) ADC 122. The operational amplifier depicted is an OPA2690 manufactured by Texas Instruments, Inc. The signal path for nanosecond step-scan channel amplification subcircuit 120 exhibits fast settling and low noise. The multiplexer used in connection with the schematic depicted FIGS. 3B and 6 is AD8184 from Analog Devices Inc. The gain selectivity and DAC operation is controlled by USB/SPI communication subcircuit 126, which includes using two MCP2210 USB/SPI interface boards 126a and 126b manufactured by Microchip Technology Inc., in cooperation with computing system 100. For example, USB/SPI communication subcircuit 126 provides gain selection, DAC control, and data communication with computing device 102 of computing system 100.

Signal conditioning module 110 includes summing subcircuit 114. Summing subcircuit 114 enables the removal or subtraction of dark interferogram offset voltage from signal 112 received from the detector during nanosecond step-scan measurement after a sample is exposed to a stimulus, e.g. laser flash and the like. By removing the dark interferogram offset voltage from the step-scan interferogram for each mirror position over a progressive range of mirror positions, a resulting signal of interest is created. Summing subcircuit 114 may also include a programmable gain setting and is able to amplify the resulting signal of interest as well as the dark interferogram offset voltage that is received when the dark interferogram offset voltage is obtained as described above prior to providing the respective signals to the respective subcircuit. For example, summing subcircuit 114 may have a gain of 8, 10, or higher.

As shown in the figures, summing subcircuit 114 is operably connected to dark interferogram offset channel amplification subcircuit 118, nanosecond step-scan channel amplification subcircuit 120, and computing system 100 through USB/SPI communication subcircuit 126.

Summing subcircuit 114 is depicted as being a noninverting amplifier in a closed-loop configuration. For example, as used in connection with FIG. 3C and the examples below, summing subcircuit 114 is an OPA843 operational amplifier manufactured by Texas Instruments Inc., and is configured to have a gain of 8, however other gains, e.g. a gain of 10 or higher gains, or a gain of at least 10 may be used.

For example, in connection with FIGS. 3A-3C, representing an example fabricated schematic of signal conditioning module 110, summing subcircuit 114 does not contribute significant noise to signal conditioning module 110, e.g. input noise voltage RMS (root mean square) value is about 0.011 mV where the bandwidth of interest is 20 MHz, as it is less than the noise floor set by the output of photodetector and TIA.

Signal conditioning module also includes digital-to-analog converter (DAC) 116 and analog-to-digital converter (ADC) 122. For example, as used in connection with FIGS. 2B and 3C and the examples below, DAC 116 may be component part AD5791, 20 bit resolution with a ±5V reference voltage manufactured by Analog Devices Inc. and, for example, ADC 122 may be Spectrum DN2.441-02, 16 bit resolution manufactured by Spectrum Instrumentation GmbH. Other components and operating conditions that are capable of carrying out the described functionalities and features, whether in hardware or software form, having the same or different features than those described herein, are also suitable.

The method of removing a dark interferogram offset voltage and thereby obtain the resulting signal of interest with signal conditioning module 110 will first be described generally and then in further detail with reference to FIGS. 4 and 5.

A dark interferogram offset voltage is obtained by taking a dark interferogram measurement with respect to a given mirror position by exposing a sample to infrared radiation or other similar stimuli, without stimulus, e.g. laser flash. The dark interferogram is provided to signal conditioning module 110 and dark interferogram offset amplification subcircuit 118 is configured to amplify the same and provide the amplified signal to computing system 100 for storage for later use. Signal conditioning module 110 is also configured to determine whether system drift has occurred, including drift for dark interferogram offset voltage and circuit intrinsic offset voltage. During nanosecond step-scan measurements of the sample by an FTIR spectrometer, the sample is exposed to laser flash or other stimuli for a given mirror position over a progressive range of mirror positions. The resulting nanosecond step-scan interferogram is provided to signal conditioning module 110 which creates a resulting signal of interest for each given mirror position by removing the dark interferogram offset voltage of the sample correspondence to the same given mirror position. Additionally, any intrinsic offset voltage of signal conditioning module 110 may also be removed. The resulting signal of interest is provided to nanosecond step-scan channel amplification subcircuit 120 for amplification thereof.

For example, obtaining and determining any intrinsic offset for signal conditioning module 110 may be accomplished as follows for both the dark interferogram channel amplification subcircuit 118 and nanosecond step-scan channel amplification subcircuit 120. The output of detector's TIA (not depicted) or the input of summing subcircuit 114 is connected to ground, the output of DAC 116 is set to zero volts, and the channel gains of both dark interferogram channel amplification subcircuit 118 and nanosecond step-scan channel amplification subcircuit 120 are set to unity. If there is any nonzero output of either dark interferogram channel amplification subcircuit 118 and nanosecond step-scan channel amplification subcircuit 120, such is considered as intrinsic offset and is digitized by ADC 122 and provided to computing system 100 for storage. In the event each of the channel gains for dark interferogram channel amplification subcircuit 118 and nanosecond step-scan channel amplification subcircuit 120 are greater than unity, the resulting intrinsic offset is multiplied by the applicable gain value and stored in computing system 100. For example, during real-time measurements and operation of signal conditioning module 110, the stored intrinsic offset values are provided to DAC 116 and removed via subtraction. For example, in general the intrinsic offset voltage may be corrected to the least significant bit (LSB) voltage of DAC 116 or, in the case of the example schematic and DAC 116 of FIGS. 2B and 3C, around 0.95 µV. Thus offering the opportunity of uncovering microvolt signals of interest.

A method 128 of obtaining a dark interferogram offset voltage for a mirror position is as follows. As shown in FIG. 4 at 130a the initial gain for dark interferogram channel amplification subcircuit 118 is set to unity. Block 130b includes measuring the intrinsic circuit voltage offset by ADC 122 and such value is applied and subtracted by DAC 116. The measured circuit offset voltage is applied to DAC 116 via USB/SPI communication subcircuit 126.

Method 128 proceeds to block 132 where the intrinsic circuit voltage offset is checked to confirm that the full scale signal amplitude voltage is between one-fourth and one-half the full scale ADC voltage. If so, the signal is within quantization range and method 128 proceeds following the path labelled "yes" to step 134. If the full scale signal amplitude voltage is not between one-fourth and one-half of the full scale ADC voltage, method 128 proceeds following the path labelled "no" to block 140 to confirm that the signal amplitude voltage is out of range, i.e., $>V_{FS}/2$, or under-ranged, i.e. Noisefloor $<V_{ADC}<|V_{FS}/4|$, thus returning to 130a increasing the amplitude of the dark offset signal as shown in FIG. 4.

During the dark interferogram measurement cycle 134, summing subcircuit 114 senses input signal from photodetector (not depicted) and DAC 116 outputs system offset. The net result is that summing subcircuit 114 provides is the dark interferogram offset voltage.

With reference to block 140, 140 checks whether the signal of interest is under-range or over-range (out of range), e.g., $>V_{FS}/2$. If the Noise floor is less than the voltage of ADC 122 and the voltage of ADC 122 is less than the absolute value of one-fourth the full scale voltage of interest, then the gain of dark interferogram channel amplification subcircuit 118 needs to be increased, (e.g. back to block 130a), in order to achieve optimal SINAD (signal-to-noise plus distortion ratio). With reference to block 140, if the voltage of ADC 122 is greater than half the absolute value of the full scale voltage of the ADC, then method 128 proceeds to step 142 to determine whether the measured dark interferogram offset voltage saturates ADC 122. At step 142, if interferogram voltage is too large such that it exceeds ADC full scale range even with unity path gain, the ADC full scale voltage is provided back to summing subcircuit 114 via DAC 116 to bring the signal down to the quantization level, e.g. $V_{FS}/4$ to $V_{FS}/2$. After one time at this step 142 the output level is applied to ADC quantization level, meaning the result is "−", that the offset voltage of intrinsic circuit voltage offset is equal to the full scale voltage of ADC minus the absolute value of intrinsic circuit voltage offset, method 128 proceeds to step 134 and the dark interferogram offset voltage can be recorded and stored in computing system 100. However, if the result continues to saturate ADC 122, the result of block 136 is "+", the dark interferogram offset voltage is too large to measure at the given mirror position or the sample setup is in error, see, e.g. reference number 138.

Figure 4:
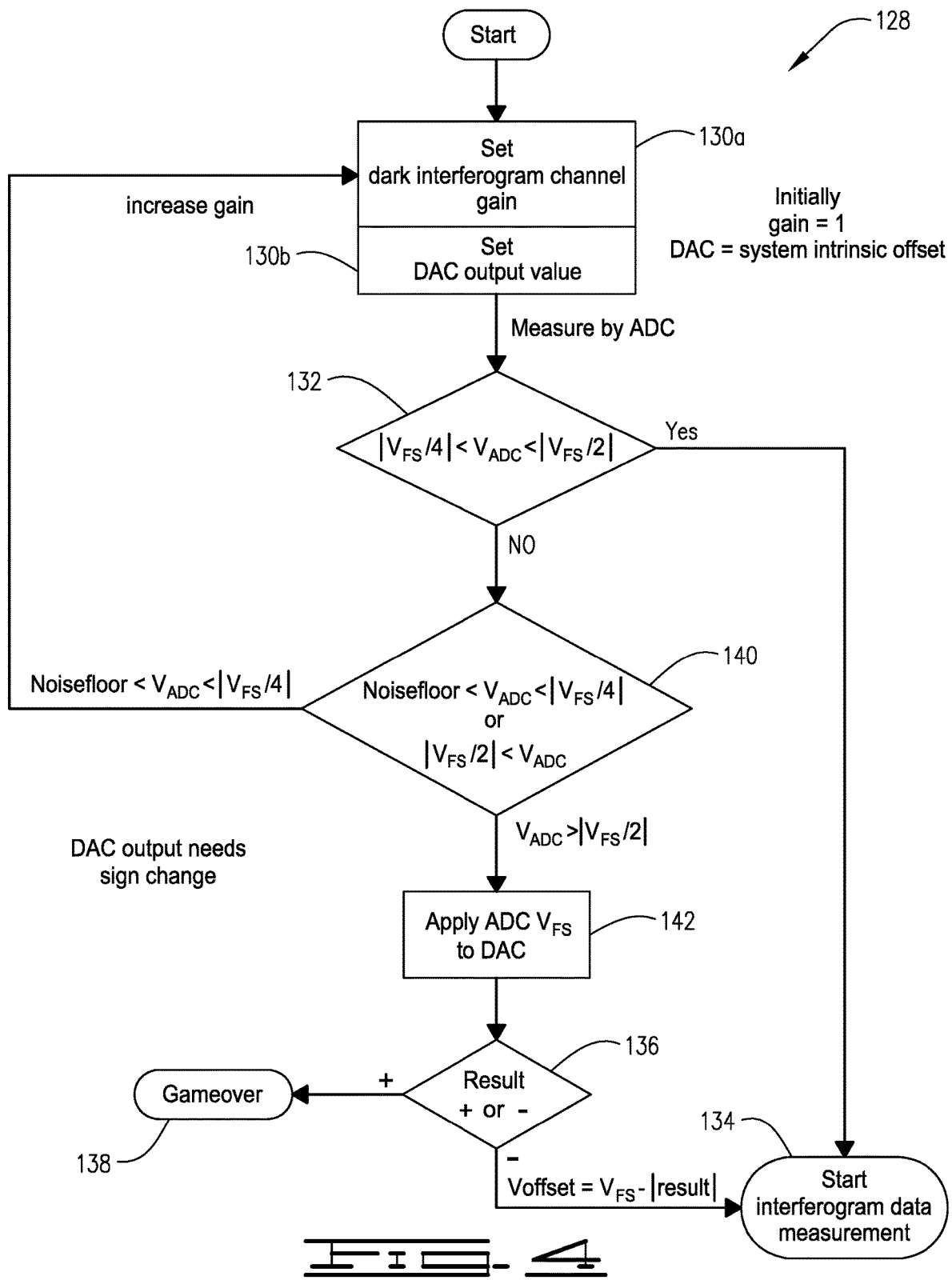
FIG. 4 is an example program flow chart for dark interferogram offset measurement in obtaining a dark interferogram offset voltage.

With reference to the above paragraph, block 136 checks and for out-of-range or in-range but saturating, where out of range goes to block 138 as described above and in-range but saturation goes to block 134 as depicted in FIG. 4.

The digitized dark interferogram offset voltages are stored in computing system 100 via USB/SPI communication subcircuit 126. Method 128 is repeated with respect to different mirror positions over a progressive range of mirror positions.

With reference to FIG. 5, following the completion of measuring the dark interferogram offset voltage described in relation to FIG. 4, signal conditioning module 110 is ready for nanosecond step-scan FTIR measurement. Method 144 depicted in FIG. 5 utilizes nanosecond step-scan channel amplification subcircuit 120.

During nanosecond step-scan FTIR measurement, the circuit intrinsic offset may be measured (not depicted in FIG. 5) in the manner described previously, such measurement is not required. After the completion of measuring the circuit intrinsic offset, if done, the nanosecond step-scan amplification channel subcircuit 120 is ready to commence method 144.

At 146a, the gain for nanosecond step-scan amplification channel subcircuit 120 is initially set to unity and the DAC output value at 146b is initially set to the corresponding dark interferogram offset voltage obtained from method 128 described above for that given mirror position.

Optionally, system drift can be determined at step 148. The stored dark interferogram offset voltage obtained via method 128 for the given mirror position described above is applied at the input of summing subcircuit 114 before laser flashes are applied to a sample to ensure there is no system drift and after laser flashes to double check that the setup configuration is stable while using nanosecond step-scan amplification channel subcircuit 120 to measure the output.

The application of dark interferogram offset voltage to the input of summing subcircuit 114 prior to laser flash is to ensure there is no system drift. If there is no system drift the output should be about zero or otherwise fall within an acceptable range of minimal drift, see e.g. 148. If it is determined there is drift, the drift is then measured (see block 150, by repeating the dark interferogram offset voltage measurement and replacing the previously obtained measurement with this new measurement) and providing the newly measured dark interferogram offset voltage back to DAC 116 at block 146b and the method continues back to 148 to determine if the output is substantially zero volts. For example, after all mirror positions are measured, method 144 re-measures the dark interferogram offset voltage for all mirror positions to ensure minimal drift.

With reference to step 152, utilizing nanosecond step-scan channel amplification subcircuit 120, after the removal of system offset as described above, the laser flash (or other suitable stimulus) is applied to the sample, and measured precise interferogram is applied to DAC 116 in block 154. The output of the nanosecond step-scan channel amplification subcircuit 120 is measured by ADC 122. If the signal is not large enough to be measured (as depicted in path Noisefloor $<V_{ADC}<$$IV_{FS}/4I$ from block 154), the gain of nanosecond step-scan channel amplification subcircuit 120 is increased accordingly and brought back to 146a. If the signal is large enough to be measured, e.g. the voltage of ADC 122 is less than half the absolute value of the full scale voltage of ADC but greater than one-fourth the full scale voltage of ADC, then the method proceeds to block 156 to start measuring and recording data. When less than one-fourth the full scale voltage of ADC, the method proceeds to 146a to further increase gain as shown in FIG. 5.

The resulting signal from method 144 is the signal of interest having the dark interferogram offset voltage removed therefrom. Nanosecond step-scan channel amplification subcircuit 120 may then amplify the resulting signal of interest as set forth in the present disclosure.

For example, method 128 can be done for all mirror positions prior to commencing method 144. In addition, method 128 can be done for a given mirror position and then alternate to method 144 for the same mirror position, and continue in such fashion until all mirror positions over the progressive range of mirror positions are measured.

Methods 128 and 144 depict the adjustable channel gains. Such adjustments may vary per the application of the sample to be measured using the FTIR spectrometer and can be changed or otherwise selected or manipulated by the user for the given application/sample measurement in the associated program in connection with computing system 100.

The disclosed signal conditioning module is reflective of efforts to minimize noise and system offset, including intrinsic voltage offset. Noise is introduced by signal 112, e.g. noise generated by detector and transimpedance amplifier (not depicted) of the FTIR spectrometer. Preferably, noise of signal conditioning module 110 is to be maintained below the detector noise floor of the FTIR spectrometer by a factor of about six to eight times. Other noise contributors to signal conditioning module 110 include the components therein, e.g. operational amplifiers and one or more feedback resistors. Values and efforts to minimize noise are provided in this disclosure, including in the examples discussion below.

For example, the non-limiting example schematic of nanosecond step-scan channel amplification subcircuit 120 of FIG. 3B and FIG. 6 is arranged as a plurality of cascaded non-inverting amplifiers, for example, seven cascaded non-inverting amplifiers, whose number of stages can be controlled, in part, by computing system 100 via USB/SPI communication subcircuit 126, two multiplexers (MUXs), attenuator 124, and an output stage, e.g. amplifier circuit depicted to the right of attenuator 124. For example, the amplifiers used by nanosecond step-scan channel amplification subcircuit 120 can be OPA2690 operational amplifiers manufactured by Texas Instruments Inc.

For example, the example signal conditioning module 110 depicted in the figures uses ADC 122 to quantize the output signals and noise of signal conditioning module 110 so that the resolution thereof can be increased, for example, by oversampling. Suitable ADC 122 includes those having a wide signal dynamic range and large SNR. Methods for increasing resolution and the associated data processing are known in the art and will not be discussed.

Noise performance of the signal path for nanosecond step-scan channel amplification subcircuit 120 can be analyzed using the amplifier cascade model depicted in FIG. 7. For example, FIG. 7 depicts 3 stages of cascading amplifiers where each stage has it own input noise voltage $v_{n,in,rms,n}$; with the goal of finding the input referred noise voltage. For example, when signal conditioning module 110 is in operation, one of the primary sources of noise is summing subcircuit 114 since it is cascaded in front of signal path of nanosecond step-scan channel amplification subcircuit 120. When all of the gain stage is in operation, the overall bandwidth of the cascade chain is depended on number of stages. The example schematic of FIGS. 3B and 8 illustrate a cascade of seven identical stages, the overall gain equation can be written as $$A_{v(s),overall} = \left(\frac{A_v}{1 + \frac{s}{\omega_{3dB}}}\right)^n, \quad \text{(equation 1)}$$

where $A_v$ is closed-loop gain of each stage and $\omega_{3dB}$ is stage bandwidth and n is number of stages. The overall bandwidth is at frequency where $\omega=\omega_{3dB}$. Thus by taking the magnitude of equation 1 at $\omega=\omega_{3dB}$, yields:

$$|A_{v(s=j\omega),total}| = \left(\frac{A_v}{\sqrt{1 + \frac{\omega^2}{\omega_{3dB}^2}}}\right)^n \bigg|_{\omega=\omega_{3dB}} = \frac{A_v^n}{\sqrt{2}}. \quad \text{(equation 2)}$$

Solving equation 2, the overall bandwidth is related to stage bandwidth by $$f_{overall} = f_{3dB}\sqrt{2^{\frac{1}{n}} - 1}. \quad \text{(equation 3)}$$

For the schematic depicted in FIGS. 3B and 6 for nanosecond step-scan channel amplification subcircuit 120, each amplifier stage has bandwidth of 79 MHz. There are, in total 8 stages, 7 amplifier stages and one final stage, cascaded. By using equation 3, the overall signal path bandwidth is estimated to 24 MHz.

EXAMPLES

The presently disclosed inventive concepts will now be addressed in reference to certain non-limiting examples. The present disclosure is not to be limited to the specific steps, experimentation, results, and/or laboratory procedures described in the examples. Rather, these examples are meant to be exemplary and not exhaustive.

As previously described, FTIR spectroscopy has wide applications across multiple disciplines. FTIR spectroscopy enables the ability to view into molecular structures and determine the identity of a material or sample. Factors affecting FTIR spectroscopy performance include spectrum resolution and speed. The spectrum resolution determines the size of the particle the instrument can identify and the speed determines the slowest reaction the instrument can capture. These two factors correspond to the performance of the detector and electronic circuit, respectively. Accordingly, more sensitive and wider optical range detectors and high speed electronics are desirable.

To the extent details regarding certain component parts of the various subcircuits or functional results, e.g. gains, noise, and other values, including those shown in FIGS. 3A-3C, were described above, such are incorporated herein for brevity and to avoid repetition.

As will be further described in these examples, a simulated signal conditioning module and fabricated signal conditioning module are used in connection with Bruker Vertex 80V FTIR spectrometer manufactured by Bruker, Inc. The simulated and fabricated signal conditioning module receive the detector output signal 112 from the FTIR spectrometer. The output signal is an interferogram of a sample. As previously described, signal 112 may also go through a transimpedance amplifier (TIA), not depicted, and the output of the TIA is signal 112 provided to signal conditioning module 110.

For example, the Bruker Vertex 80V is a vacuum FTIR spectrometer with a SiC MIR/FIR source which has 10000 reciprocal centimeters or wave meters ($cm^{-1}$) to 20 $cm^{-1}$. The Bruker Vertex 80V includes a high precision Michelson interferometer with a beam splitter of range 8000 $cm^{-1}$ to 350 $cm^{-1}$. The photodetector used in the Bruker Vertex 80V FTIR spectrometer is manufactured by Kolmar Technologies, Inc. and is a liquid nitrogen cooled photovoltaic MCT detector with a bandwidth of about 16 MHz which results in about an 18 ns rise time.

Input signal 112 is digitized by a 16-bit ADC (not depicted); however, the present disclosure is not limited to such number of bits, as it may be digitized to a lesser or greater number of bits. For this example, the signal conditioning module 110 was configured to have an input referred noise 38 times below the detector noise floor, thus supporting detectors with a wider bandwidth or about 8 times higher noise detector. The signal conditioning module 110 and associated techniques and methods also seek to minimize the intrinsic offset by using components that have as low as possible input offset. The fabricated signal conditioning module of the present examples is able to trim the intrinsic offset voltage down to an acceptable level of ±LSB of the DAC.

For example, the ADC 122 used in connection with the fabricated signal conditioning module is a Spectrum DN2.441-02, 16 bit manufactured by Spectrum Instrumentation GmbH. In the examples below, ADC 122 is connected with coax cable and 50 Ohm ($\Omega$) impedance matched. ADC is used with a 50$\Omega$ path and ±2.5V reference range to avoid distortion from reflections for the example below. However, the full range or any other value that does not adversely affect the described functionality is suitable.

The example fabricated signal conditioning module 110 receives an input signal from a commercial spectrometer photodetector which was determined to have an output noise of about 0.38 milli Volts (mV). For the design in these examples, it exhibited an input referred noise of about 0.084 mV, as worst case, which is −13.1 decibels (dB) or an acceptable noise floor at 2 bits lower than the detector noise floor. Accordingly, the measured results support that the fabricated signal conditioning module for these examples illustrate it does not contribute significant noise and thereby preserves the photodetector noise floor well. The fabricated module includes a programmable high gain setting to amplify both signal and noise into the ADC quantization range to allow signal averaging for obtaining additional bits of resolution (and thereby further enhance the spectroscopy data and allow for more accurate interferograms). The noise can be averaged down in order to preserve as much resolution and dynamic range as practical.

Intrinsic voltage offset introduced by any of the electronics are capable of being further corrected and were corrected to the noise floor utilizing suitable components, including a high precision digital-to-analog-converter (DAC). The apparatus, techniques, and methods of the present disclosure enable accurate interferogram measurements and post-laser excitation exploration in nanosecond speed. Such functions were able to be accomplished, in part, due to the dark interferogram offset channel amplification subcircuit 118 and nanosecond step-scan channel amplification subcircuit 120. For example, the measured intrinsic offset for dark interferogram offset channel amplification subcircuit 118 was about 1.75 mV, which is capable of being corrected to the least significant bit (LSB) of the DAC, which is about 9.5 μV (well below the noise floor). For example, the nanosecond step-scan channel amplification subcircuit 120 was determined to have about 25 nanoseconds (ns) 10%-90% settling time, which is approximately equivalent to a 14 MHz bandwidth.

Simulation Example

Simulation results of summing subcircuit 114 and nanosecond step-scan channel amplification subcircuit 120 of signal conditioning module 110 are provided.

FIG. 9 depicts an example schematic of a simulation of summing subcircuit 114 of signal conditioning module 110. For the simulation, DAC 116 input was set to zero by grounding the connection as shown in FIG. 9 in the circle labeled as 158. As a result of the simulation a 300$\Omega$ resistor is added at the output (labeled as 160) to reduce the Q factor of LRC circuit which includes wire inductance and parasitic load capacitance. For purposes of simulation, the power plane and coupling capacitance of a PCB were factored in as well and designated with reference number 162.

Figure 11:
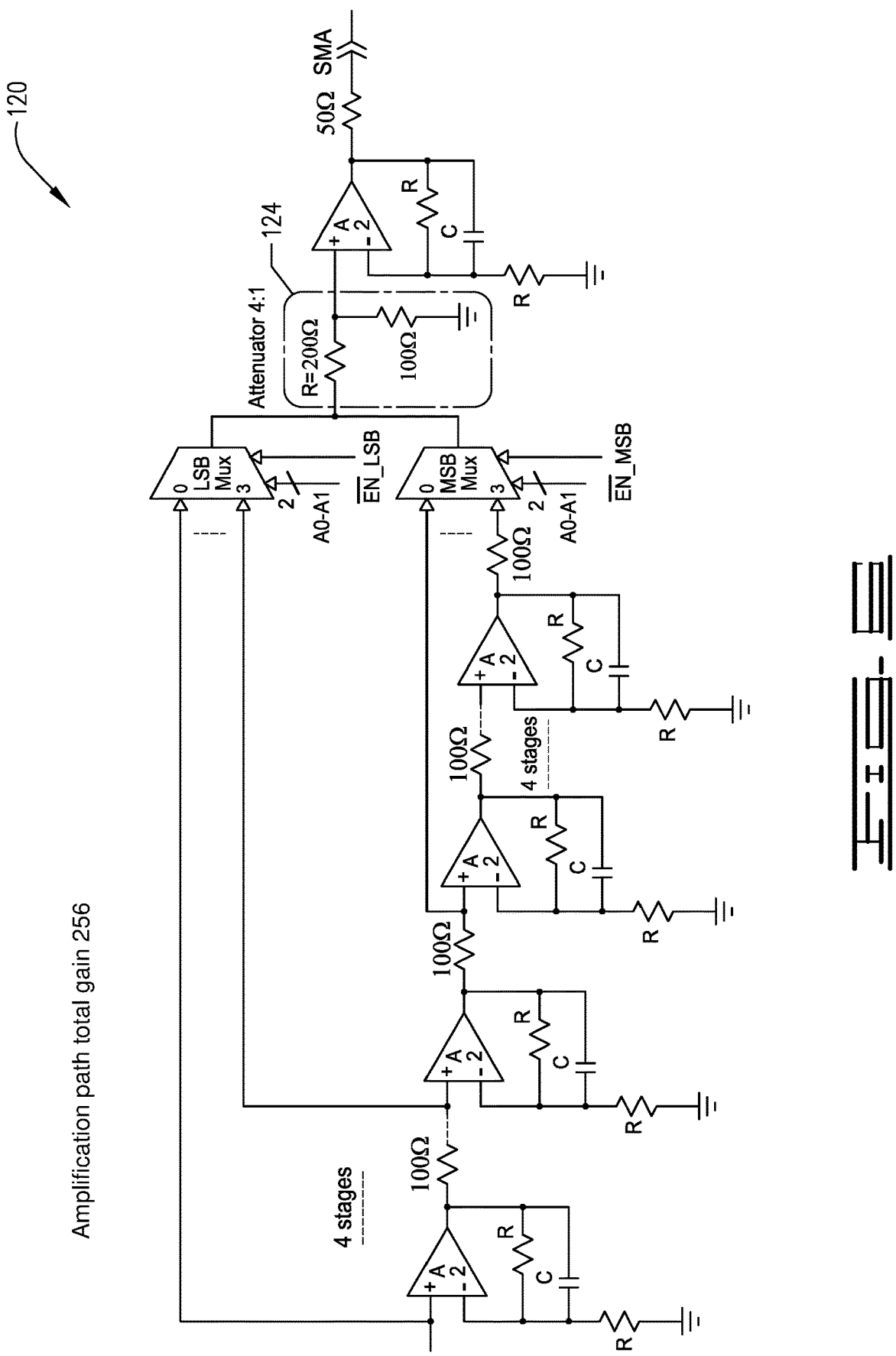
FIG. 11 illustrates a screen image of stage gain and phase values of the summing subcircuit of FIG. 9.
Figure 10:
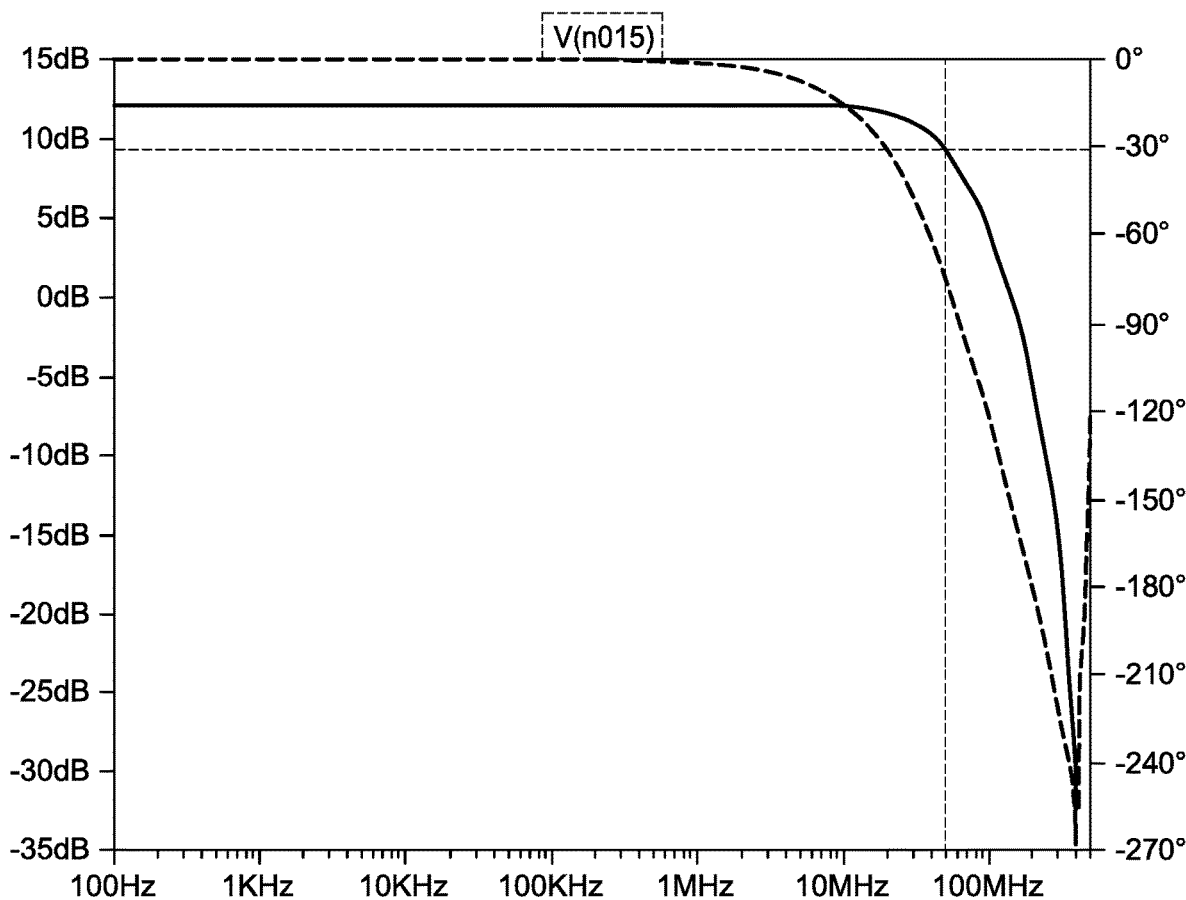
FIG. 10 illustrates a frequency response of the simulation summing subcircuit of FIG. 9.
Figure 11:
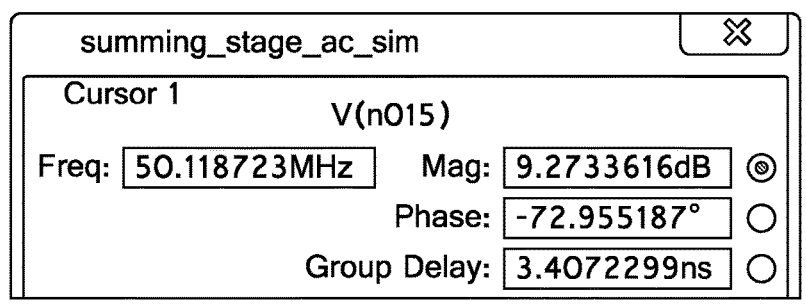

The stage gain of summing subcircuit 114 was designed and simulated for a gain of 8. The resistor divider shown by reference number 164 makes the overall stage gain 4 or 12 dB. The phase margin is about 105° (degrees). FIGS. 10 and 11 depict the simulated results of the aforementioned data for the simulation of the example schematic depicted in FIG. 9. FIG. 10 illustrates a frequency response of the simulation summing subcircuit of FIG. 9 where the solid line is the gain magnitude plot and the dotted line is phase plot. FIG. 12 illustrates a transient response waveform of the simulation summing subcircuit of FIG. 9 and FIG. 13 depicts a screen image of transient response data of the summing subcircuit of FIG. 9. For this simulation, the input signal was a voltage pulse with 10 ns rising and falling times, 0.4 µs (microsecond) period, and 25% duty cycle. The simulated stage 10% to 90% settling time was about 10 ns as shown in FIG. 13 (e.g. Horz. value under Diff (Cursor2−Cursor1)).

Figure 14:
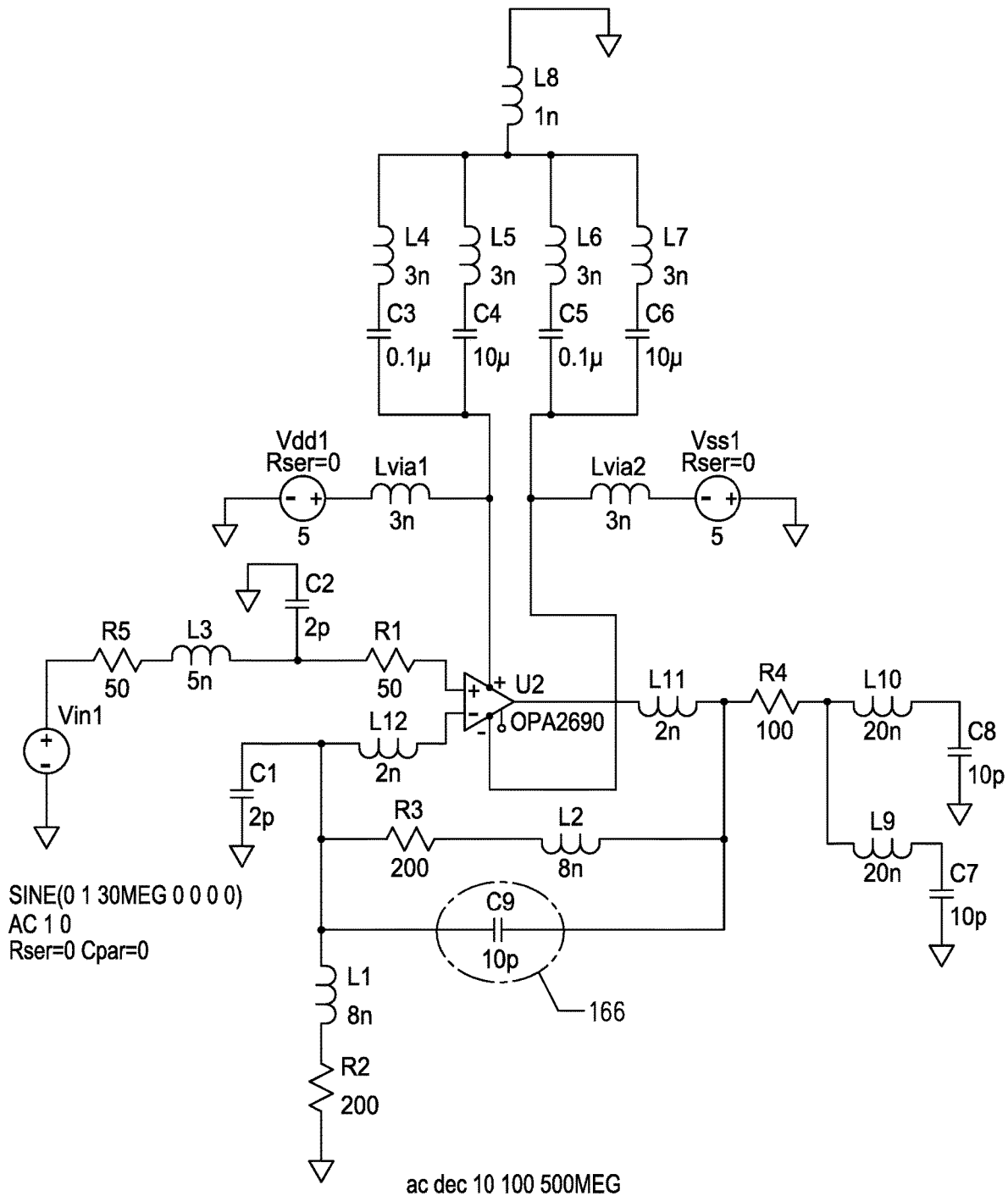
FIG. 14 is an example schematic of a simulation of a single stage nanosecond step-scan amplifier of the nanosecond step-scan channel amplification subcircuit of signal conditioning module.

FIG. 14 is an example schematic of a simulation of a single stage nanosecond step-scan amplifier of the nanosecond step-scan channel amplification subcircuit 120 of signal conditioning module 110.

Feedback capacitor 166 in FIG. 14 of the simulation schematic mitigates the effect created by parasitic capacitance at the inverting input of the amplifier.

Figure 15:
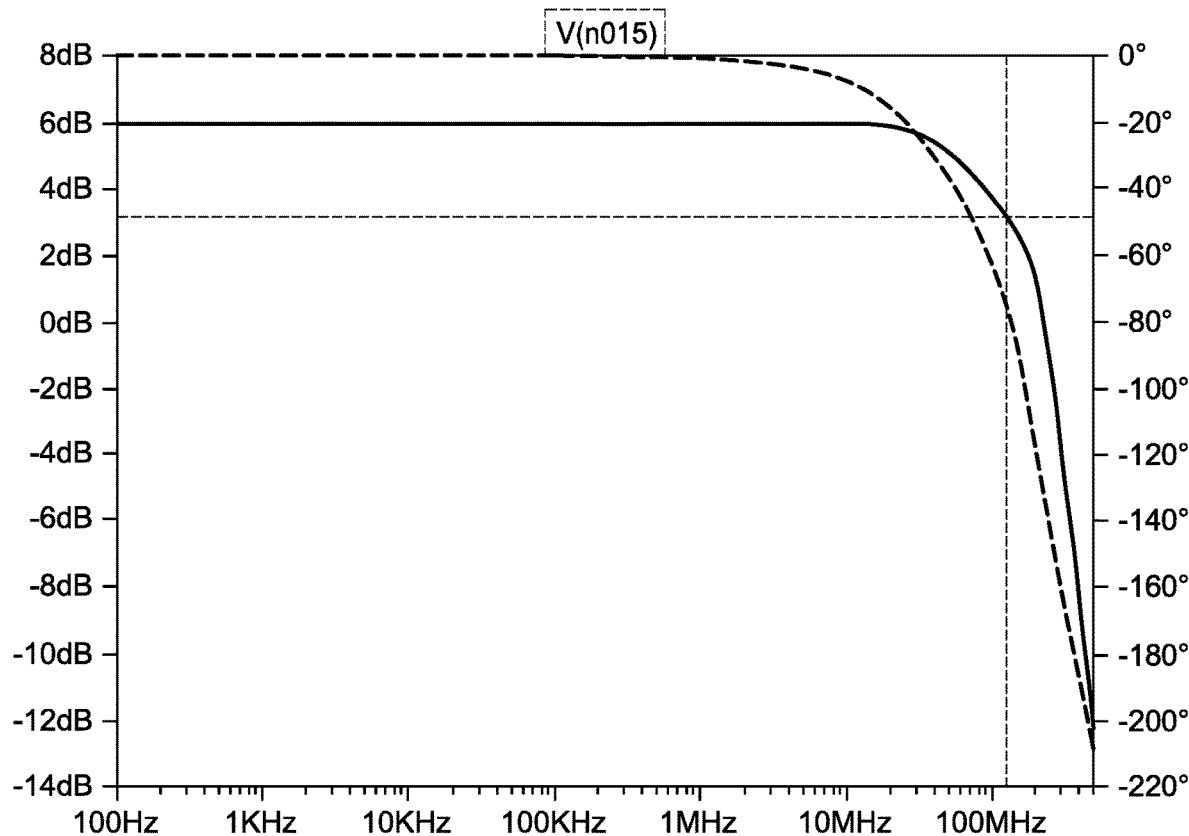
FIG. 15 illustrates a single stage ac simulation frequency response of the single stage of nanosecond step-scan channel amplification subcircuit of FIG. 14.
Figure 16:
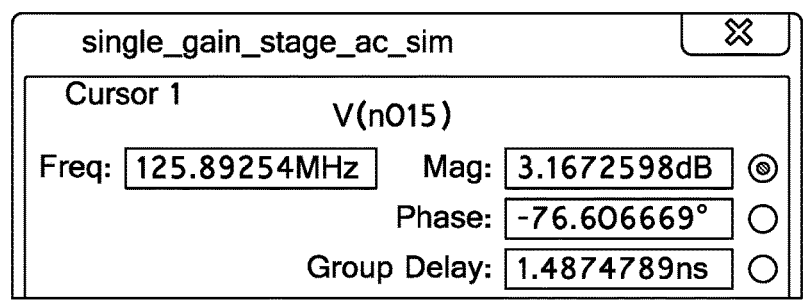
FIG. 16 illustrates a screen image of stage gain and phase values of the single stage of nanosecond step-scan channel amplification subcircuit of FIG. 14.

FIG. 15 illustrates a single stage ac simulation frequency response Bode plot of the single stage nanosecond step-scan amplifier of FIG. 14. FIG. 16 illustrates a screen image of stage gain and phase values of the waveform depicted in FIG. 15. The solid line in FIG. 16 is gain magnitude plot and the dotted line is phase plot. The gain of this stage is set to 2, which is 6 dB where the phase margin is 104°.

Figure 17:
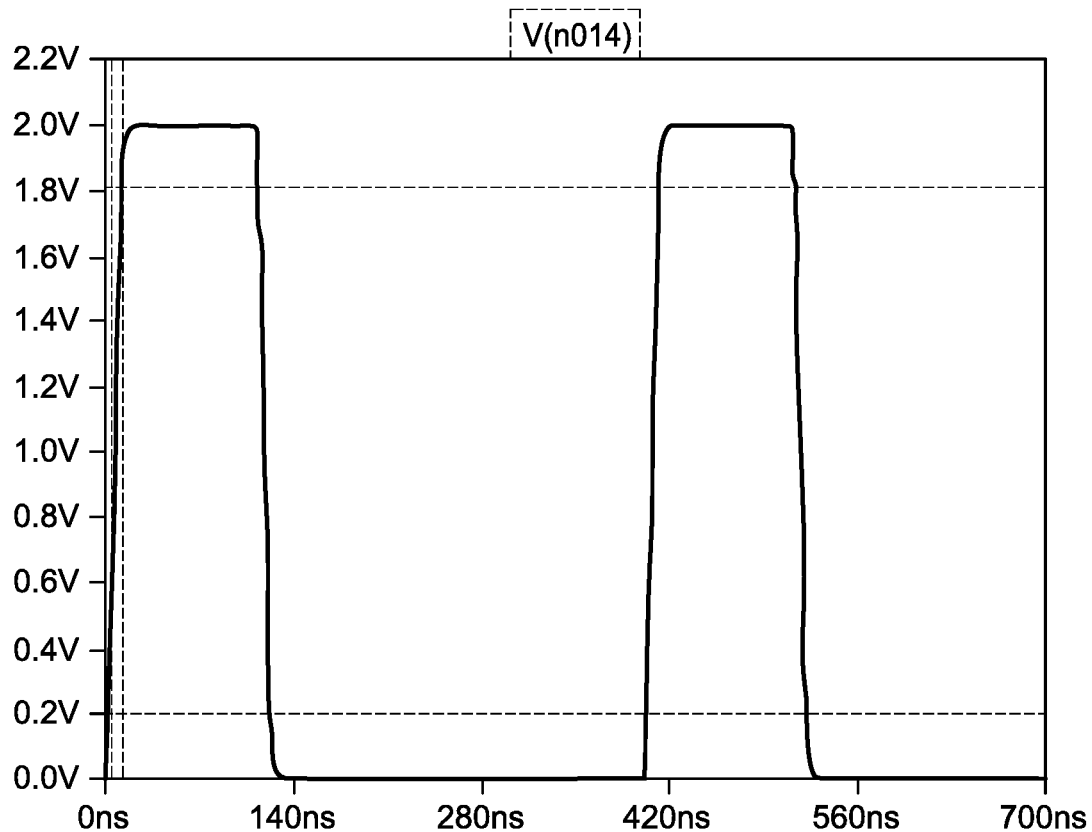
FIG. 17 illustrates a transient response waveform of the single stage of nanosecond step-scan channel amplification subcircuit of FIG. 14.
Figure 18:
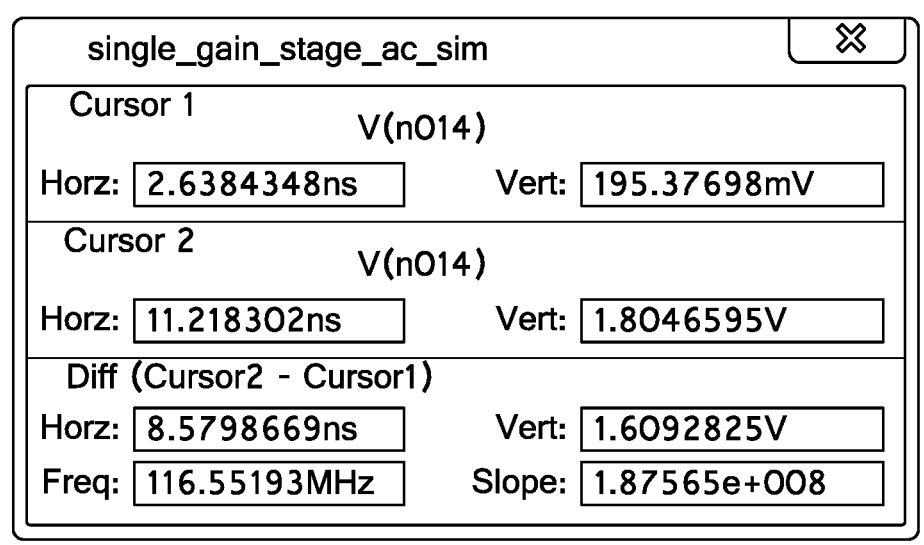
FIG. 18 illustrates a screen image of transient response data of the single stage nanosecond step-scan channel amplification subcircuit of FIG. 14.

FIG. 17 illustrates a transient response waveform of the single stage nanosecond step-scan amplifier of FIG. 14. FIG. 18 illustrates a screen image of transient response data of the single stage nanosecond step-scan amplifier of FIG. 14. The input signal was a voltage pulse with a 10 ns Simulation Program with Integrated Circuit Emphasis (SPICE) rise time, 0.4 µs period, and 25% duty cycle. The simulated 10% to 90% settling time is 8.5 ns as shown in FIG. 18.

Figure 19:
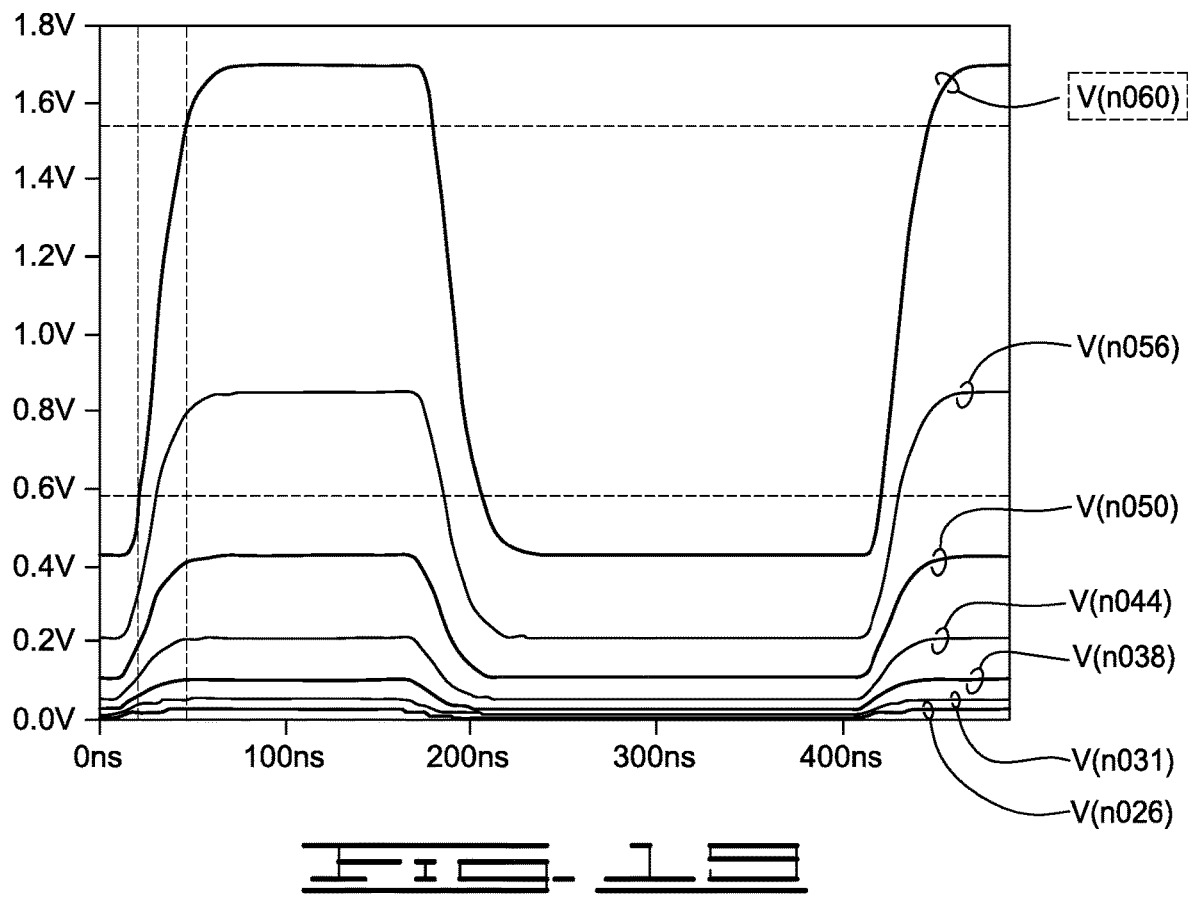
FIG. 19 illustrates a simulation of a transient response waveform at the output of a seventh stage of the nanosecond step-scan channel amplification subcircuit.
Figure 20:
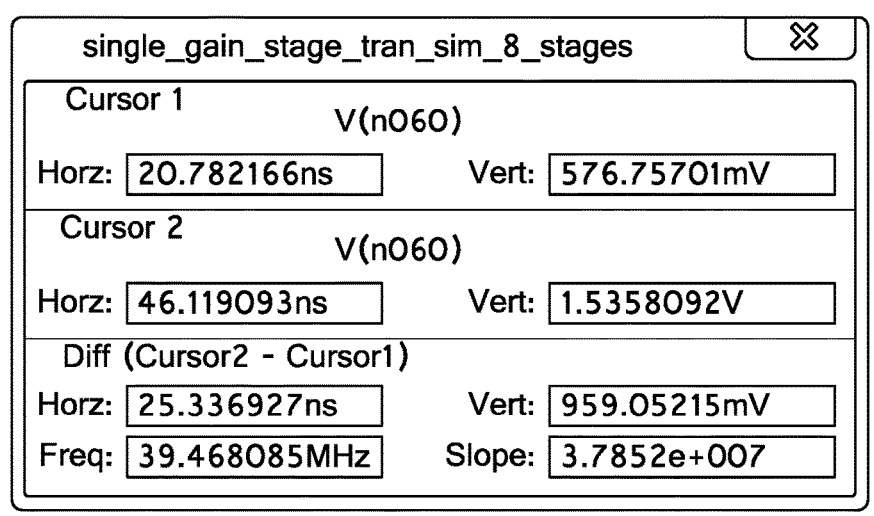
FIG. 20 illustrates a screen image of transient response data corresponding to V(n060) in FIG. 19.

FIG. 19 illustrates a simulation of a transient response waveform at the output of a seventh stage of the simulated nanosecond step-scan amplification channel subcircuit 120. FIG. 20 illustrates a screen image of transient response data corresponding to V(n060) in FIG. 19. The waveform labeled V(n060) in FIG. 19 was measured at the last stage of the simulated subcircuit 120. The input signal is a voltage pulse with 18 ns SPICE rise time, 0.4 µs period, and 35% duty cycle. The simulated 10% to 90% settling time is 25 ns as shown in FIG. 20. The simulation results for the simulated nanosecond step-scan amplification channel subcircuit 120 show that simulated nanosecond step-scan amplification channel subcircuit 120 has about 25 ns settling time as shown in FIG. 20 (e.g. Horz value under Diff (Cursor2−Cursor1)).

Measurement Example

Measurements of a fabricated signal conditioning module 110 corresponding to FIGS. 3A-3C, 6 and 8 are provided. As will be seen, measurements include circuit intrinsic offset voltages, input referred noise measurements for both dark interferogram offset channel amplification subcircuit 118 and nanosecond step-scan channel amplification subcircuit 120. Measurements for intrinsic offset correction for dark interferogram offset channel amplification subcircuit 118 and transient response measurements of nanosecond step-scan channel amplification subcircuit 120 are also provided.

The intrinsic offset measurement of a fabricated signal conditioning module 110 depicted in FIGS. 3A-3C is obtained by grounding the pin for detector output while DAC 116 outputs zero volts. Offset is measured at the final output of dark interferogram offset channel amplification subcircuit 118 and nanosecond step-scan channel amplification subcircuit 120 separately. Table 1 below shows the offset measurement of dark interferogram offset channel amplification subcircuit 118 with incremental channel gain as well as the input referred intrinsic offset voltage. For purposes of this measurement, summing stage subcircuit 114 has gain of 8. When input referred, the output offset value is divided by path gain of dark interferogram offset channel amplification subcircuit 118 and by summing stage gain of summing subcircuit 114.

TABLE 1

| Path gain | Output offset | Input referred offset |
|---|---|---|
| 1 | 14.03 mV | 1.75 mV |
| 2 | 28.13 mV | 1.76 mV |
| 4 | 56.35 mV | 1.76 mV |
| 8 | 112.6 mV | 1.759 mV |
| 16 | 225.5 mV | 1.762 mV |
| 32 | 451 mV | 1.762 mV |
| 64 | 902 mV | 1.762 mV |
| 128 | 1.81 V | 1.763 mV |
| 256 | 3.61 V | 1.763 mV |
| 512 | 7.23 V | 1.765 mV |

In the same way, the intrinsic offset of nanosecond step-scan channel amplification subcircuit 120 was measured. The data is presented in Table 2.

TABLE 2

| Path gain | Output offset | Input referred offset |
|---|---|---|
| 1 | 6.98 mV | 1.74 mV |
| 2 | 12.81 mV | 1.60 mV |
| 4 | 24.07 mV | 1.50 mV |
| 8 | 47.07 mV | 1.47 mV |
| 16 | 92.1 mV | 1.44 mV |
| 32 | 0.184 V | 1.44 mV |
| 64 | 0.367 V | 1.43 mV |
| 128 | 0.729 V | 1.42 mV |

As presented in Tables 1 and 2, the input referred offset voltage of dark interferogram offset channel amplification subcircuit 118 and nanosecond step-scan channel amplification subcircuit 120 is about 1.75 mV.

Figure 21:
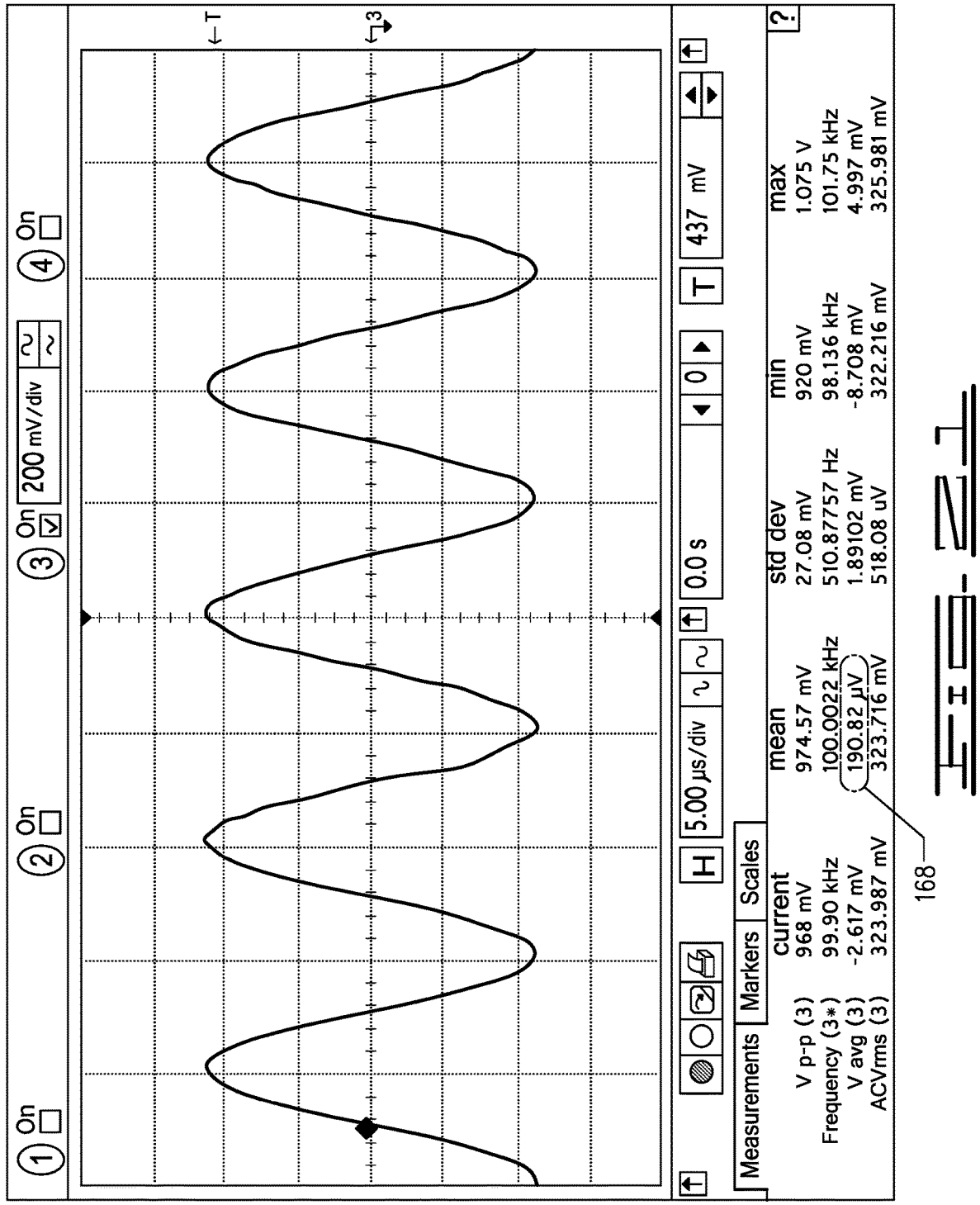
FIG. 21 depicts the measured dark interferogram offset channel amplification subcircuit correction.

The nanosecond step-scan channel amplification subcircuit 120 has stage gain of 2. As shown by the tables, when input referred, there is a moderate increase of offset voltage as stage gain increases. Also as shown in the table, the higher path gains have input referred offset drops below the value of the first stage, e.g., path gain 1. As discussed in the present disclosure, the circuit intrinsic offset voltage can be corrected by providing the measured offset value back to DAC 114 to remove or subtract it out. FIG. 21 depicts the measured dark interferogram offset channel amplification subcircuit correction to be about 191 µV as designated with reference numeral 168. Note however, that for purposes of this example, the input sine test signal generates constant distortion term due to the nonlinearity of the amplifier, which adds to the DC offset. Accordingly, the measured result should have a slightly higher value.

Noise of the fabricated signal conditioning module 110 was measured by grounding the pin to the output of the detector and outputting zero volts from DAC 116. Noise was measured at the final output of dark interferogram offset channel amplification subcircuit 118 and nanosecond step-scan channel amplification subcircuit 120 separately. Table 3 and Table 4 show the noise of dark interferogram offset channel amplification subcircuit 118 and nanosecond step-scan channel amplification subcircuit 120, respectively. As can be seen in both tables, the input referred noise of both dark interferogram offset channel amplification subcircuit 118 and nanosecond step-scan channel amplification subcircuit 120 is below the output noise of the detector as desired. For example, the input referred noise of dark interferogram offset channel amplification subcircuit 118 is 0.084 mV and nanosecond step-scan channel amplification subcircuit 120 is 0.045 mV, whereas the noise floor of the detector is 0.38 mV as described elsewhere in this disclosure.

TABLE 3

| Path gain | Output noise | Input referred noise |
|---|---|---|
| 1 | 0.67 mV | 0.084 mV |
| 2 | 1.66 mV | 0.104 mV |
| 4 | 2.15 mV | 0.067 mV |
| 8 | 3.34 mV | 0.052 mV |
| 16 | 7.16 mV | 0.056 mV |
| 32 | 12.56 mV | 0.049 mV |
| 64 | 24.08 mV | 0.047 mV |
| 128 | 48.6 mV | 0.047 mV |
| 256 | 96.6 mV | 0.047 mV |
| 512 | 200 mV | 0.049 mV |

TABLE 4

| Path gain | Output noise | Input referred noise |
|---|---|---|
| 1 | 0.23 mV | 0.045 mV |
| 2 | 0.75 mV | 0.089 mV |
| 4 | 2.38 mV | 0.12 mV |
| 8 | 6.03 mV | 0.13 mV |
| 16 | 13.82 mV | 0.15 mV |
| 32 | 30.18 mV | 0.16 mV |
| 64 | 57.58 mV | 0.16 mV |
| 128 | 0.132 V | 0.16 mV |

Figure 22:
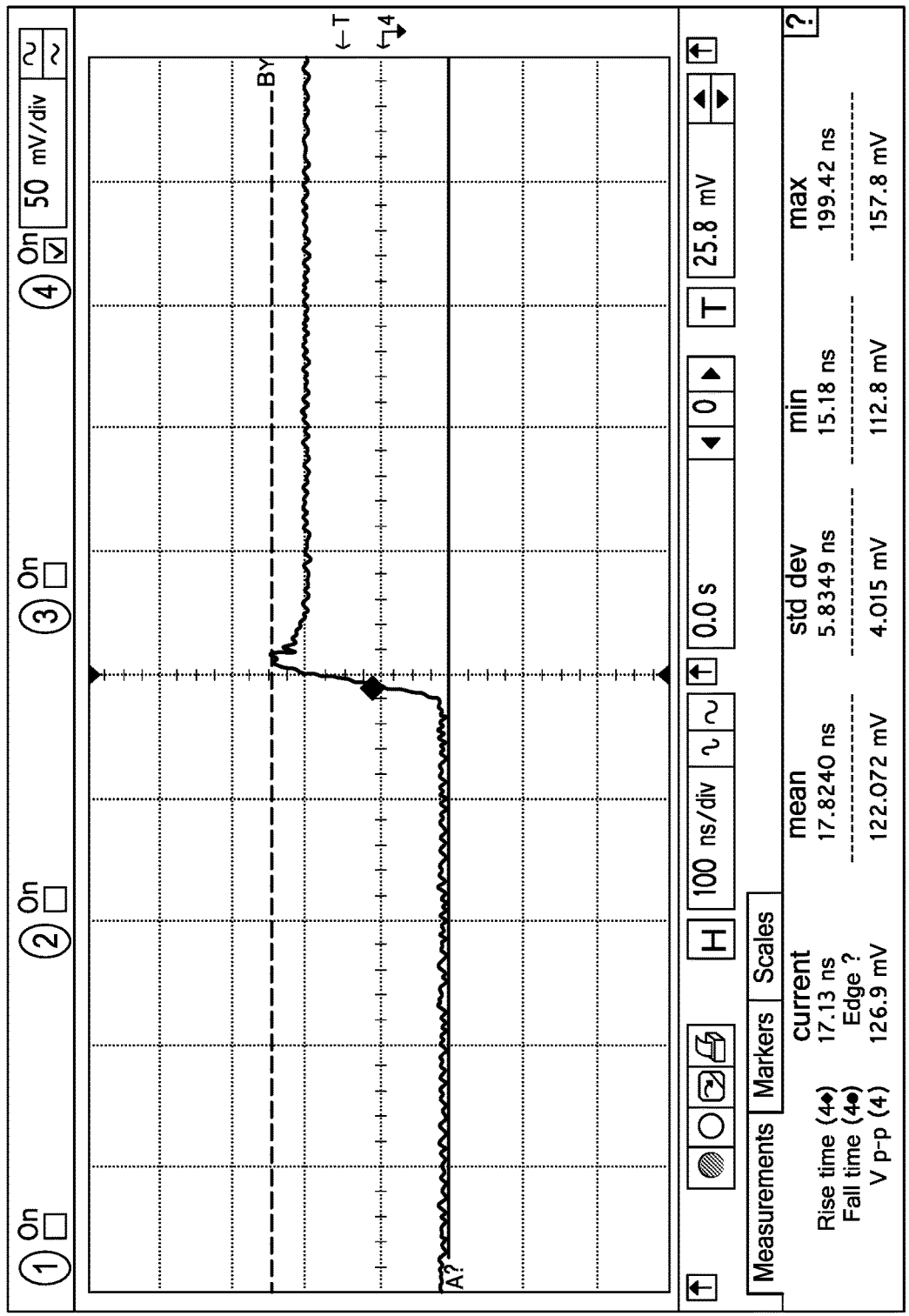
FIG. 22 illustrates a signal rise time of unity channel gain for the nanosecond step-scan channel amplification subcircuit.
Figure 23:
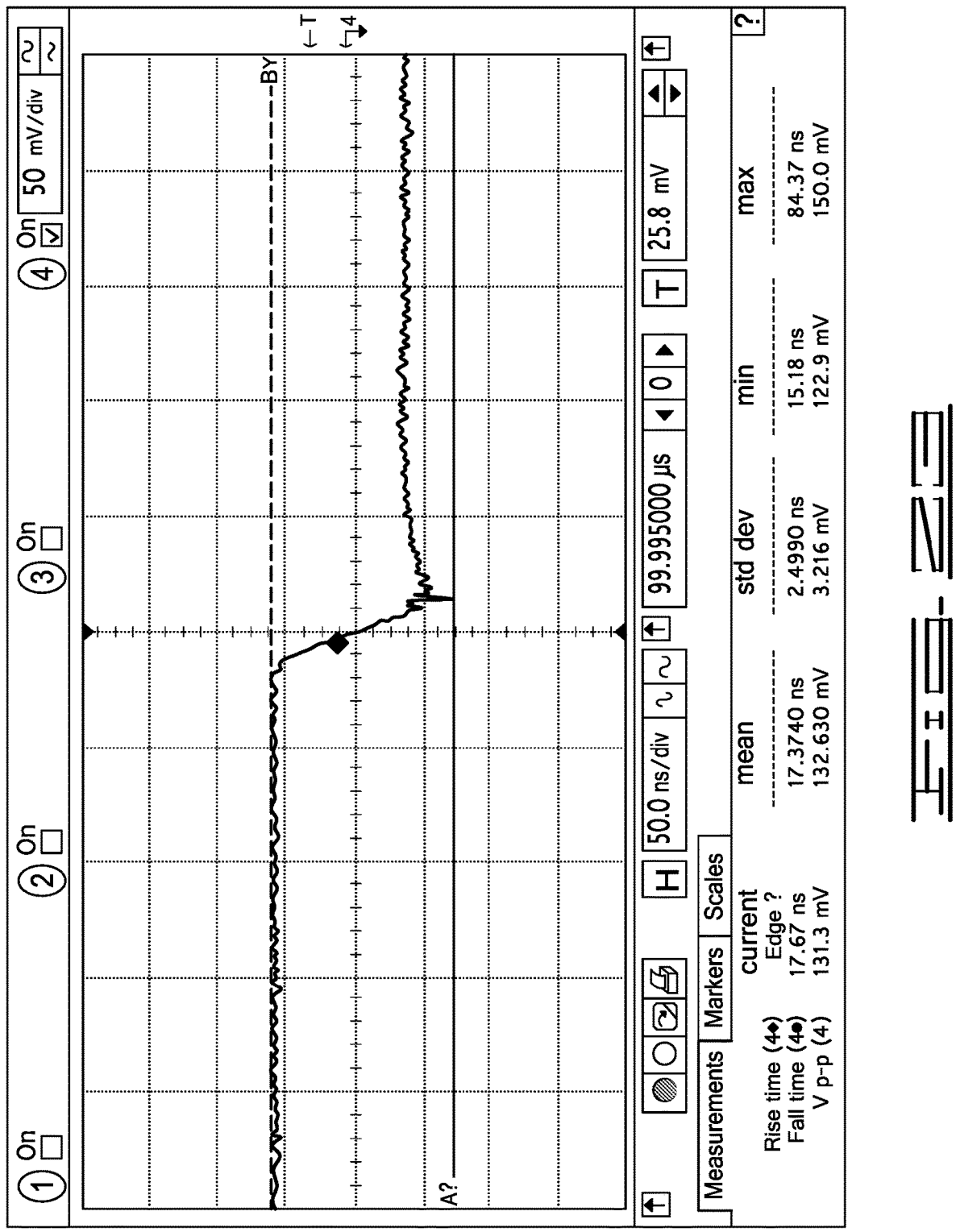
FIG. 23 illustrates a signal fall time of unity channel gain for the nanosecond step-scan channel amplification subcircuit.

The transient response of nanosecond step-scan channel amplification subcircuit 120 with unity gain (FIGS. 22 and 23) and a gain of 32 (FIGS. 24 and 25) are depicted. FIGS. 22 and 23 show the transient response when the channel gain is unity. The input signal is a 100 mV$_{PP}$ (millivolt peak-to-peak) pulse with an 18 ns rise and fall time, 1 millisecond (ms) period, and 10% duty cycle. The edge time is measured as 17.8 ns as shown in the FIG. 22, mean rise time.

Figure 24:
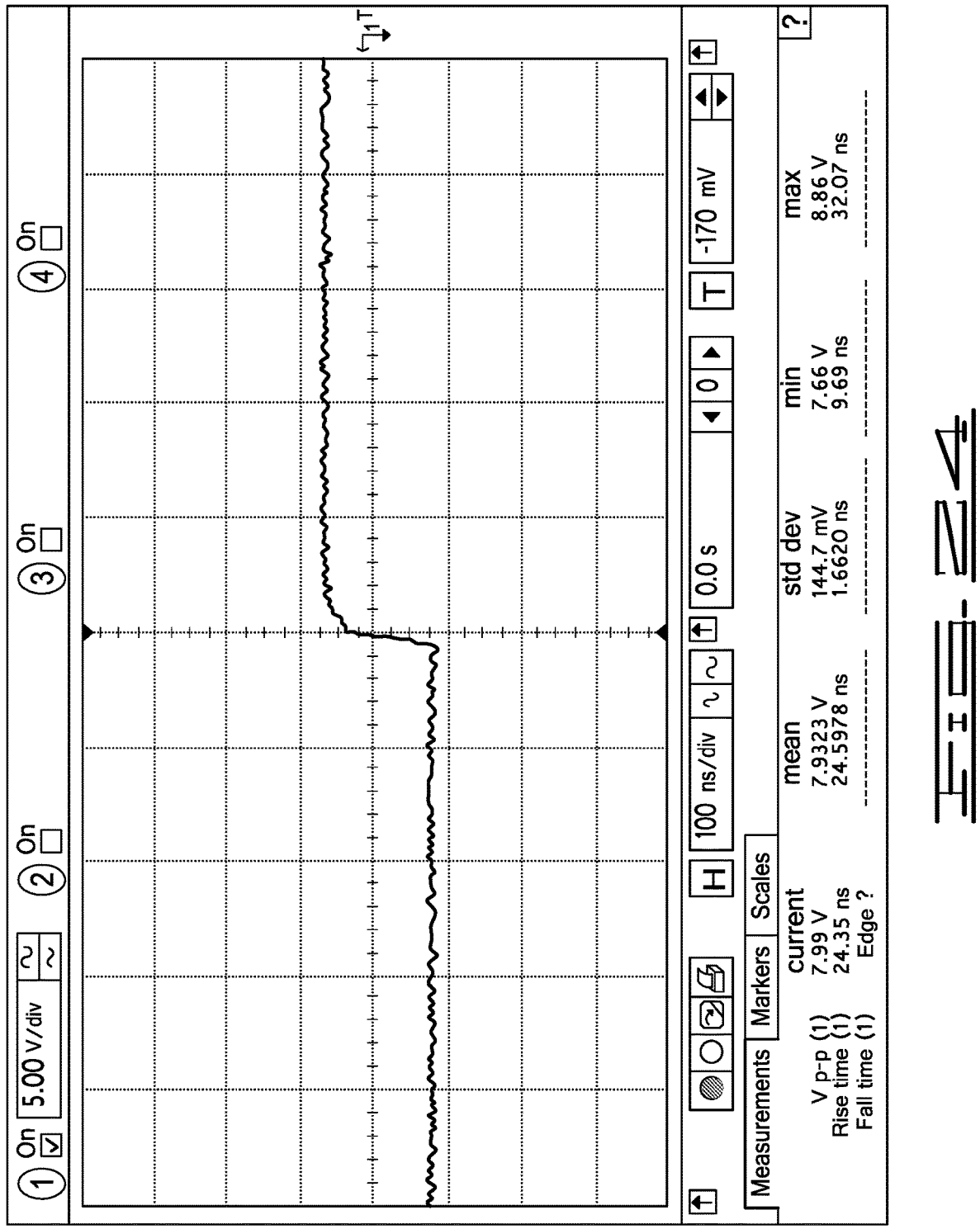
FIG. 24 illustrates a signal rise time of 32 channel gain for the nanosecond step-scan channel amplification subcircuit.
Figure 25:
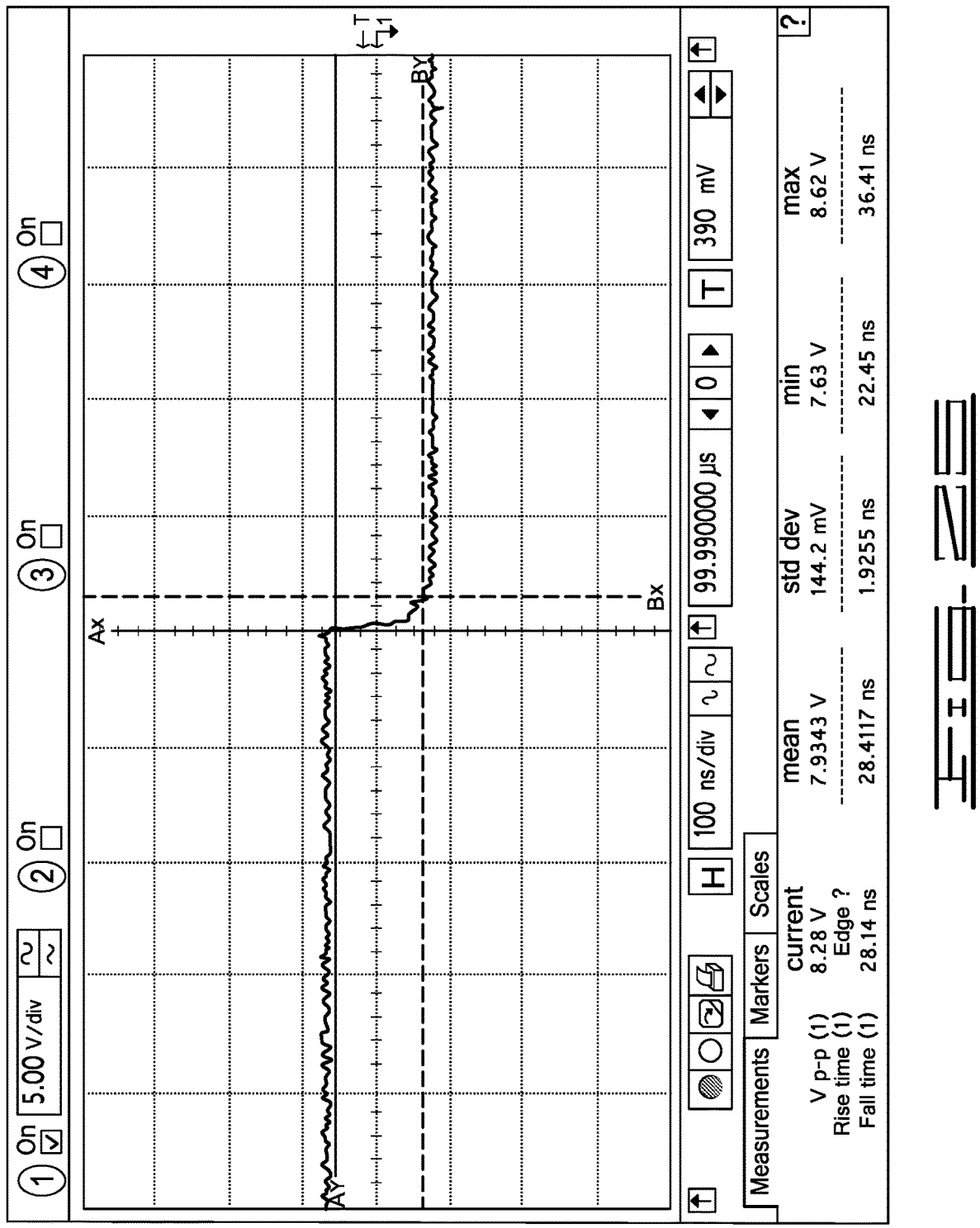
FIG. 25 illustrates a signal fall time of 32 channel gain for the nanosecond step-scan channel amplification subcircuit.

FIGS. 24 and 25 show the transient response when path gain is set to 32. The input signal is the same as described with reference to FIGS. 22 and 23. The measured rise and fall time at channel output are 24.6 ns (FIG. 24, mean rise time) and 28.4 ns (FIG. 25, mean fall time), respectively.

Other example apparatuses, systems, methods, techniques, and algorithms are disclosed.

A method comprising the steps of: obtaining a dark interferogram voltage of a sample for a step scan FTIR mirror position and recording the dark interferogram voltage obtained for such mirror position. The method further includes the steps of: performing an offset to the dark interferogram voltage by removing the dark interferogram voltage of the sample at the mirror position to provide a resulting new dark interferogram voltage having a voltage of about zero volts or close thereto, e.g. a few microVolts; and amplifying the resulting new dark interferogram voltage after offset so that the stimulus (e.g. infrared radiation (or other similar stimulus or stimuli that results in a change of material state of a sample)) induced changes in the dynamic interferogram (changing in time) voltage are recorded (e.g. in computing system 100) to the full range or near the full range of nanosecond (or microsecond) analog-to-digital converter. The method further includes the step of performing a pulsed stimulation to sample (such as a nanosecond laser flash) to trigger stimulus induced changes in the interferogram voltage, e.g. the resulting signal after dark current removal. Wherein prior to moving to each subsequent mirror position the dark interferogram and amplification of the sample for the given mirror position is reset to the initial condition.

A signal conditioning module configured to remove dark voltage from an interferogram during a nanosecond (or microsecond) step-scan measurement and thereby enable continuous data collection for time-resolved Fourier transform infrared (FTIR) spectroscopy without a cut-off time, the signal conditioning module comprising: a summation subcircuit, wherein the summation subcircuit receives input from a FTIR spectrometer representative of time-resolved FTIR spectroscopy data in the form of an interferogram during a nanosecond (or microsecond) step-scan measurement of the FTIR spectrometer, and removes a dark interferogram offset voltage from the received interferogram to produce a resulting differential signal of interest for amplification and continuous data collection during the nanosecond (or microsecond) step-scan measurement of the FTIR spectrometer. The signal conditioning module further includes a dark interferogram offset channel amplification subcircuit operably connected with the summation subcircuit and a computing system, wherein the dark interferogram offset channel amplification subcircuit measures the dark interferogram voltage which is used to offset dark interferogram voltage to zero or very close to zero (e.g. a few microvolts); and a step-scan channel amplification subcircuit operably connected to the summation subcircuit, wherein the nanosecond step-scan channel amplification channel subcircuit receives the resulting signal of interest and amplifies the resulting signal of interest to produce an amplified resulting differential signal of interest for nanosecond (or microsecond) data collection.

A method comprising the steps of: exposing a sample to infrared radiation (or other suitable stimulus) over a progressive range of mirror positions to obtain dark interferogram voltage values and dynamic stimulus induced changes in interferogram values of the sample over the progressive range of mirror positions; repeating step-scan interferogram data collection of the sample at each mirror position; and interpreting the dark interferogram voltage values from all mirror positions over the progressive range of mirror positions to obtain a single beam Fourier transform infrared spectrum of the sample. The method further includes the steps of: performing repeated step-scan data collection on dynamic interferogram voltages (e.g. the signal after dark current removal) by exposing the sample to a stimulus to trigger changes in the sample over each mirror position and repeating the said step-scan data collection over the progressive range of mirror positions; constructing a time-resolved step-scan interferogram spectrum at one specific time after a stimulation with all mirror positions in the progressive range by subtracting the dark interferogram spectra to the dynamic differential interferogram spectrum over said progressive range of mirror positions to obtain a resulting time-resolved interferogram spectrum of interest; and repeating the foregoing to obtain time-resolved interferogram spectrum for each time point after a stimulus. The method further includes the steps of: performing Fourier transform of each interferogram spectrum to obtain its corresponding single beam step-scan FTIR spectrum; and repeating the foregoing for each time to obtain a set of step-scan FTIR spectra over the entire range of time of interest (e.g. the duration of the experiment of interest or the observation period of the sample to be monitored and enable real-time monitoring, observation, and measurement of the same in an continuous manner). The method may further include the step of calculating a final time-resolved step-scan FTIR difference absorption spectra by using the formula $\Delta A(v_i, t_j) = -\log_{10}[I(v_i, t_j)/I(v_i, dark)]$ where $v_i$ is the wavenumber, while $t_j$ is a specific time after stimulus. By analogy, the foregoing sentence is a photonic equivalent of the summation subcircuit's efforts, e.g. an optical description of the discussion above with reference to FIGS. 4 and 5. Wherein the step-scan described in the method is nanosecond step-scan. Wherein the step-scan described in the method is microsecond step-scan.

A method comprising the steps of obtaining a dark interferogram voltage of a sample for a mirror position; adding an offset dark interferogram voltage to said dark interferogram voltage for said mirror position to provide a reduced dark interferogram voltage; and performing a step-scan measurement by exposing said sample to a stimulus to obtain a differential interferogram voltage of said sample for said mirror position. Wherein the step-scan measurement is nanosecond step-scan. Wherein the step-scan measurement is microsecond step-scan.

A method comprising the steps of obtaining a dark interferogram voltage of a sample for a mirror position; using said dark interferogram voltage to offset an instantaneous differential interferogram for said mirror position, wherein said instantaneous differential includes a pre-stimulus differential interferogram voltage and a post-stimulus differential interferogram voltage; and performing a step-scan measurement by exposing said sample to a stimulus to obtain a differential interferogram voltage of said sample for said mirror position, wherein said differential interferogram voltage has said dark interferogram voltage and said pre-stimulus differential interferogram voltage of said instantaneous differential interferogram removed therefrom. Wherein the step-scan measurement is nanosecond step-scan. Wherein the step-scan measurement is microsecond step-scan. Note that the step-scan measurement may occur for a progressive range of mirror positions and for many points in time.

The offset applied to the interferogram voltages may be done to both pre-stimulus and post-stimulus interferogram voltages. The present disclose provides the ability to collect small stimulus-induced FTIR data in DC mode, e.g. no cut-off at milliseconds), and the ability to record data with high ADC resolution for data quality.

A signal conditioning module configured to remove dark interferogram voltages from an instantaneous interferogram voltages during a nanosecond step-scan measurement and thereby enhance time-resolved Fourier transform infrared (FTIR) spectroscopy data, the signal conditioning module comprising: a summation subcircuit, wherein said summation subcircuit receives input from an infrared detector in an FTIR spectrometer performing time-resolved step-scan FTIR spectroscopy measurement, and removes said dark interferogram voltages from said instantaneous interferogram voltages for a mirror position to produce a differential interferogram signal of interest during said step-scan FTIR spectroscopy measurement. The signal conditioning module further comprising a dark interferogram offset channel amplification subcircuit operably connected with said summation subcircuit and a computing system, wherein said dark interferogram offset channel amplification subcircuit measures said dark interferogram voltages; and a step-scan channel amplification subcircuit operably connected to said summation subcircuit, wherein said step-scan channel amplification channel subcircuit receives said differential interferogram signal of interest and amplifies said differential interferogram signal of interest to produce an amplified differential interferogram signal of interest.

A method comprising the steps of: exposing a sample to infrared radiation over a progressive range of mirror positions to obtain dark interferogram voltage values of said sample over said progressive range of mirror positions; interpreting the dark interferogram voltage values of said sample over said progressive range of mirror positions to obtain a single beam dark Fourier transform infrared spectrum of said sample; performing a step-scan data collection by exposing said sample to a stimulus to obtain differential interferogram voltage values over said progressive range of mirror positions; and interpreting the differential interferogram voltage values for each mirror position over said progressive range of mirror positions by subtracting the dark interferogram voltage value for each mirror position over said progressive range of mirror positions to obtain a resulting time-resolved differential interferogram spectrum of interest.

The disclosed apparatuses, systems, methods, and techniques are not limited to the example application described herein. Such examples are for readability and ease of understanding and are not intended nor should be limited to the disclosed application of use, equipment, or any numerical values provided in connection with such examples. For example, the disclosed systems, techniques, and methods of improving and enhancing the quality of FTIR spectroscopy data can be used in connection with other FTIR spectrometers and other physical, electronic, and software equipment. Wherein said reduced offset dark interferogram voltage is approximately a negative of said obtained dark interferogram voltage such that said reduced dark interferogram voltage is one or more microvolts.

Although certain steps are described herein and illustrated in the figures as occurring sequentially, some steps may occur simultaneously with each other (unless context excludes that possibility) or in an order that is not depicted. Certain steps described herein and illustrated in the figures may be implemented by performing or completing manually, automatically, or a combination thereof, of selected steps or tasks. The present disclosure of the disclosed methods, techniques, functions, and systems and apparatuses are not to be limited to the precise descriptions and illustrations. Other embodiments will be apparent to one skilled in the art. As such, the foregoing description merely enables and describes the general systems, methods, and uses disclosed herein. While certain embodiments have been described for the purpose of this disclosure, those skilled in the art can make changes without departing from the spirit and scope thereof. Thus, the appended claims define what is claimed.

What is claimed is:

1. A method comprising:
   obtaining a dark interferogram voltage of a sample for a mirror position;
   using said dark interferogram voltage to offset an instantaneous differential interferogram for said mirror position, wherein said instantaneous differential includes a pre-stimulus differential interferogram voltage and a post-stimulus differential interferogram voltage; and
   performing a step-scan measurement by exposing said sample to a stimulus to obtain a differential interferogram voltage of said sample for said mirror position, wherein said differential interferogram voltage has said dark interferogram voltage and said pre-stimulus differential interferogram voltage of said instantaneous differential interferogram removed therefrom.

2. The method of claim 1, further comprising the step of amplifying said differential interferogram voltage for said mirror position.

3. The method of claim 2, wherein the step of amplifying said differential interferogram voltage for said mirror position is done with a step-scan channel amplification subcircuit.

4. The method of claim 3, wherein said step-scan channel amplification subcircuit includes a plurality of cascaded noninverting amplifiers.

5. The method of claim 2, further comprising the step of repeating the obtaining, adding, performing, and amplifying steps for all mirror positions.

6. The method of claim 1, wherein said the step of performing a step-scan measurement by exposing said sample to a stimulus to obtain a differential interferogram voltage of said sample for said mirror position is done through subtraction with a summing subcircuit.

7. The method of claim 6, wherein said summing subcircuit includes a noninverting voltage amplifier in a closed loop configuration.

8. The method of claim 1, further comprising the step of repeating the obtaining, adding, and performing steps for all mirror positions.

9. The method of claim 1, wherein the step of obtaining a dark interferogram voltage of a sample is done by exposing said sample to infrared radiation.

10. The method of claim 1, further comprising the step of storing the obtained dark interferogram voltage of said sample for said mirror position.

11. The method of claim 1, further comprising the steps of:
before performing a step-scan measurement,
obtaining a second dark interferogram voltage of said sample for said mirror position;
determining an existence for system drift by comparing the second dark interferogram voltage for said mirror position to the dark interferogram voltage for each mirror position, wherein an existence for system drift is negative if the second dark interferogram voltage for each mirror substantially matches the dark interferogram voltage for each mirror position;
wherein upon a positive existence of system drift, combining said second dark interferogram voltage with said dark interferogram voltage for each mirror position and repeating the obtaining and determining steps until a negative existence of system drift is determined; and
wherein upon determining a negative existence of system drift, proceeding to the step of performing a step-scan measurement.

12. The method of claim 1, wherein the step of using said dark interferogram voltage to offset an instantaneous differential interferogram for said mirror position is obtained by adding approximately a negative of said obtained dark interferogram voltage to said instantaneous differential interferogram thereby resulting said differential interferogram voltage having a voltage of one or more microvolts.

13. The method of claim 1, wherein the step of performing a step-scan measurement by exposing said sample to a stimulus to obtain a differential interferogram voltage of said sample for said mirror position occurs for a plurality of time points for said mirror position.

14. A signal conditioning module configured to remove dark interferogram voltages from an instantaneous interferogram voltages during a nanosecond step-scan measurement and thereby enhance time-resolved Fourier transform infrared (FTIR) spectroscopy data, the signal conditioning module comprising:

a summation subcircuit, wherein said summation subcircuit receives input from an infrared detector in an FTIR spectrometer performing time-resolved step-scan FTIR spectroscopy measurement, and removes said dark interferogram voltages from said instantaneous interferogram voltages for a mirror position to produce a differential interferogram signal of interest during said step-scan FTIR spectroscopy measurement;

a dark interferogram offset channel amplification subcircuit operably connected with said summation subcircuit and a computing system, wherein said dark interferogram offset channel amplification subcircuit measures said dark interferogram voltages; and a step-scan channel amplification subcircuit operably connected to said summation subcircuit, wherein said step-scan channel amplification channel subcircuit receives said differential interferogram signal of interest and amplifies said differential interferogram signal of interest to produce an amplified differential interferogram signal of interest.

15. The signal conditioning module of claim 14, wherein said summation subcircuit amplifies said differential interferogram signal of interest.

16. The signal conditioning module of claim 14, wherein said summation subcircuit includes a noninverting voltage amplifier in a closed loop configuration.

17. The signal conditioning module of claim 14, wherein said summation subcircuit has a gain of 8.

18. The signal conditioning module of claim 14, wherein said dark interferogram voltage is obtained from a sample by exposing said sample to infrared radiation prior to exposing said sample to a stimulus during said step-scan FTIR spectroscopy measurement.

19. The signal conditioning module of claim 14, wherein said dark interferogram offset channel amplification subcircuit includes a plurality of cascaded noninverting amplifiers.

20. The signal conditioning module of claim 19, wherein each of the cascaded noninverting amplifiers has an adjustable gain setting of unity, 2, 4, and 8.

21. The signal conditioning module of claim 19, wherein each noninverting cascaded amplifier has an adjustable gain setting, and said adjustable gain setting is operably connected to said computing system.

22. The signal conditioning module of claim 14, wherein said dark interferogram offset channel amplification subcircuit has a gain of up to about 512.

23. The signal conditioning module of claim 14, wherein said step-scan channel amplification subcircuit provides said amplified differential signal to said computing system.

24. The signal conditioning module of claim 14, wherein said step-scan channel amplification subcircuit includes a plurality of cascaded noninverting amplifiers.

25. The signal conditioning module of claim 24, wherein said a plurality of cascaded noninverting amplifiers is seven cascaded noninverting amplifiers has an adjustable gain setting of unity, 2, 4, and 8.

26. The signal conditioning module of claim 24, wherein each stage of said plurality of cascaded noninverting amplifiers has a stage gain of 2.

27. The signal conditioning module of claim 14, wherein said step-scan channel amplification subcircuit has a gain of up to about 512.

28. The signal conditioning module of claim 14, wherein said a step-scan FTIR spectroscopy measurement includes exposing said sample to a stimulus.

29. The signal conditioning module of claim 14, wherein the computing system provides control signals to said signal conditioning module.

30. The signal conditioning module of claim 14, wherein the computing system provides one or more control signals to said dark interferogram offset channel amplification subcircuit and one or more control signals to said step-scan channel amplification subcircuit.

31. The signal conditioning module of claim 30, wherein said one or more control signals to said dark interferogram offset channel amplification subcircuit and said one or more control signals to said step-scan channel amplification subcircuit are channel gain signals.

32. The signal conditioning module of claim 14, wherein said computing system includes a processor having instructions stored thereon which cause said processor to provide one or more control signals to said signal conditioning module.

33. The signal conditioning module of claim 14, wherein said summation subcircuit has a gain of 10.

34. The method of claim 14, wherein said step-scan amplification subcircuit is a nanosecond step-scan amplification subcircuit and configured to take nanosecond step-scan measurements.

35. The method of claim 14, wherein said step-scan amplification subcircuit is a microsecond step-scan amplification subcircuit and configured to take microsecond step-scan measurements.

36. The method of claim 14, wherein said step-scan channel amplification subcircuit includes eight noninverting amplifiers.

37. A method comprising:
  exposing a sample to infrared radiation over a progressive range of mirror positions to obtain dark interferogram voltage values of said sample over said progressive range of mirror positions;
  interpreting the dark interferogram voltage values of said sample over said progressive range of mirror positions to obtain a single beam dark Fourier transform infrared spectrum of said sample;
  performing a step-scan data collection by exposing said sample to a stimulus to obtain differential interferogram voltage values over said progressive range of mirror positions; and
  interpreting the differential interferogram voltage values for each mirror position over said progressive range of mirror positions by subtracting the dark interferogram voltage value for each mirror position over said progressive range of mirror positions to obtain a resulting time-resolved differential interferogram spectrum of interest.

38. The method of claim 37, further comprising the step of: amplifying the resulting time-resolved differential interferogram spectrum of interest.

39. The method of claim 38, wherein the step of amplifying the resulting time-resolved differential interferogram spectrum of interest is done using a step-scan channel amplification subcircuit.

40. The method of claim 1, wherein the step of obtaining a dark interferogram voltage of a sample for a mirror position is done for a plurality of mirror positions before the step of performing a step-scan measurement by exposing said sample to a stimulus to obtain a differential interferogram voltage of said sample for said mirror position.

41. The method of claim 1, wherein the step of obtaining a dark interferogram voltage of a sample for a mirror position is done for a progressive range of mirror positions and the step of performing a step-scan measurement by exposing said sample to a stimulus to obtain a differential interferogram voltage of said sample for said mirror position is done for said progressive range of mirror positions and the step of performing a step-scan measurement by exposing said sample to a stimulus to obtain a differential interferogram voltage of said sample for said mirror position is done in an alternative manner for a substantially same mirror position after the step of obtaining a dark interferogram voltage of a sample for a mirror position.

42. The method of claim 1, wherein said step-scan measurement is a nanosecond step-scan measurement.

43. The method of claim 1, wherein said step-scan measurement is a microsecond step-scan measurement.

* * * * *